United States Patent
Kuismanen

(10) Patent No.: US 12,158,355 B2
(45) Date of Patent: Dec. 3, 2024

(54) GENERATING AND USING POSITIONING INDICES

(71) Applicant: HERE Global B.V., Eindhoven (NL)

(72) Inventor: Saara Kuismanen, Tampere (FI)

(73) Assignee: HERE GLOBAL B.V., Eindhoven (NL)

(*) Notice: Subject to any disclaimer, the term of this patent is extended or adjusted under 35 U.S.C. 154(b) by 233 days.

(21) Appl. No.: 17/813,092

(22) Filed: Jul. 18, 2022

(65) Prior Publication Data

US 2024/0019265 A1    Jan. 18, 2024

(51) Int. Cl.
| | | |
|---|---|---|
| G01C 21/00 | (2006.01) | |
| H04W 4/02 | (2018.01) | |
| H04W 4/40 | (2018.01) | |

(52) U.S. Cl.
CPC ..... G01C 21/3841 (2020.08); G01C 21/3885 (2020.08); H04W 4/025 (2013.01); H04W 4/40 (2018.02)

(58) Field of Classification Search
CPC .................................................. G01C 21/3841
See application file for complete search history.

(56) References Cited

U.S. PATENT DOCUMENTS

| | | |
|---|---|---|
| 8,890,746 B2 | 11/2014 | Alizadeh-Shabdiz et al. |
| 9,843,890 B2 | 12/2017 | Do et al. |
| 11,218,839 B1 | 1/2022 | Huberman et al. |
| 11,562,168 B2 * | 1/2023 | Balu .................... G06V 10/764 |
| 2009/0189810 A1 | 7/2009 | Murray |
| 2024/0019265 A1 * | 1/2024 | Kuismanen ........ G01C 21/3885 |

OTHER PUBLICATIONS

"Fused Location Provider API", Retrieved via the Wayback Machine on Feb. 16, 2023, <URL:https://web.archive.org/web/20220622031834/https://developers.google.com/location-context/fused-location-provider/>, (Jun. 22, 2022), 2 pages.

Ashraf et al., "Smartphone Sensor Based Indoor Positioning: Current Status, Opportunities, and Future Challenges", Electronics 2020, 9, (May 27, 2020), 29 pages.

(Continued)

*Primary Examiner* — Michael A Berns
(74) *Attorney, Agent, or Firm* — Jason Wejnert; HERE GLOBAL B.V.

(57) ABSTRACT

An apparatus obtains instances of positioning quality information comprising respective position estimates, respective positioning approach indicators, and respective characteristics of the respective position estimates. The apparatus partitions the instances of positioning quality information into a plurality of groups, where each group corresponds to a geographic area, and partitions the instances of each group into clusters corresponding to positioning approaches. For each respective cluster of each respective group, the apparatus determines a respective positioning index based at least in part on respective characteristics of the respective instances of positioning quality information assigned to the respective cluster. The apparatus provides at least one instance of positioning index information, such that performance of a positioning and/or navigation-related function for a mobile apparatus may be controlled at least in part by the instance of positioning index information.

17 Claims, 7 Drawing Sheets

(56) References Cited

OTHER PUBLICATIONS

Du et al., "A Hybrid Outdoor Localization Scheme with High-Position Accuracy and Low-Power Consumption", EURASIP Journal on Wireless Communications and Networking, (Jan. 4, 2018), 13 pages.
Falco et al., "Loose and Tight GNSS/INS Integrations: Comparison of Performance Assessed in Real Urban Scenarios", Sensors (Basel) 2017, 17(2), (Jan. 29, 2017), 25 pages.
GPS World Staff, "Street Smart: 3D City Mapping and Modeling for Positioning with Multi-GNSS", Retrieved via the Internet on Feb. 16, 2023, <URL:https://www.gpsworld.com/street-smart-3d-city-mapping-and-modeling-for-positioning-with-multi-gnss/>, (Jul. 1, 2015), 9 pages.
Inside GNSS, "End Game for Urban GNSS: Google's Use of 3D Building Models", Retrieved via the Internet on Feb. 16, 2023, <URL:https://insidegnss.com/end-game-for-urban-gnss-googles-use-of-3d-building-models/>, (Mar. 21, 2021), 30 pages.
Kamenetsky, O., "What is Wi-Fi Positioning?", Retrieved via the Internet on Feb. 15, 2023, <URL:https://www.skyhook.com/blog/what-is-wi-fi-positioning>, (Jan. 14, 2021), 3 pages.

\* cited by examiner

GENERATING AND USING POSITIONING INDICES

TECHNOLOGICAL FIELD

An example embodiment relates generally to generating positioning indices representative of the accuracy, dependability, and/or usability of various positioning approaches in various geographical areas. An example embodiment relates generally to the use of positioning indices for performing positioning and/or navigation-relate functions, for example.

BACKGROUND

In various environments and/or in various geographic areas, different positioning approaches may be more or less effective. A mobile apparatus may not be able to determine which positioning approach is most effective in a particular geographical area. This may lead to position estimates with sub-optimal accuracy.

BRIEF SUMMARY OF SOME EXAMPLE EMBODIMENTS

Various embodiments provide methods, apparatus, computer program products, systems, and/or the like for generating positioning index information for various geographic areas and/or making use of positioning index information to perform positioning and/or navigation-related functions. In various embodiments, a network apparatus crowd-sources a plurality of instances of positioning quality information. The network apparatus processes the plurality of instances of positioning quality information to determine positioning index information for various geographic areas and various positioning approaches. The network apparatus may use or provide for another apparatus to use (e.g., a mobile apparatus, a Cloud-based positioning service, a positioning server, and/or the like) at least a portion of the positioning index information. For example, the positioning index information may be used to determine which positioning approach to use in a particular geographic area. In another example, the positioning index information may be used to determine or may provide weights to be used in a hybrid positioning approach for us in a particular geographic area.

For example, in an example embodiment, a network apparatus obtains a plurality of instances of positioning quality information corresponding to various geographic areas. For example, various probe apparatuses may generate and provide instances of positioning quality information as the probe apparatuses move through various geographic areas. The network apparatus is configured to partition, group, and/or separate the plurality of instances of positioning quality information into a plurality of groups that each correspond to a respective geographic area. For example, all of the instances of positioning quality information that correspond to a particular geographic area are assigned to the same group. For each group of the plurality of groups, the instances of positioning quality information are partitioned, clustered, and/or separated into clusters that each correspond to a respective positioning approach. Some non-limiting examples of positioning approaches are navigation satellite-based (e.g., GNSS-based), received radio signal (RSS) radio-based, timing parameter (e.g., round-trip-timing) radio-based, motion-based, visual odometry-based. For example, all of the instances of positioning quality information of a particular group that correspond to a particular positioning approach are assigned to the same cluster. The instances of positioning quality information of each cluster is processed to determine positioning index information corresponding to the respective positioning approach in the respective geographic area.

In an example embodiment, an apparatus (e.g., a network apparatus) obtains a plurality of instances of positioning quality information. Each instance of positioning quality information includes a respective position estimate, a respective positioning approach indicator configured to identify the positioning approach used to determine the position estimate, and a respective characteristic for the respective position estimate. The apparatus partitions the plurality of instances of positioning quality information into a plurality of groups with each group of the plurality of groups corresponding to a respective geographic area. A first instance of positioning quality information comprising a first position estimate is assigned to a first group responsive to the first position estimate being located within a first geographic area, the first geographic area corresponding to the first group. For each respective group of the plurality of groups, the apparatus partitions instances of positioning quality information of the respective group into a plurality of positioning approach clusters with each cluster of the plurality of clusters corresponding to respective positioning approach. The first instance of positioning quality information is assigned to a first cluster of the first group responsive to the respective positioning approach of the first instance of positioning quality information matching a first positioning approach corresponding to the first cluster. For each respective cluster of each respective group, the apparatus determines a respective positioning index based at least in part on respective characteristics of the respective instances of positioning quality information assigned to the respective cluster. The apparatus provides at least one instance of positioning index information. The at least one instance of positioning index information comprises (i) a geographic area identifier identifying the respective geographic area corresponding to the respective group, (ii) at least one positioning index and (iii) a positioning approach identifier identifying the respective positioning approach corresponding to the at least one positioning index.

In an example embodiment, an apparatus (e.g., a mobile apparatus) performs a positioning and/or navigation-related function based at least in part on an instance of positioning index information. The apparatus obtains one or more observed positioning signals. The observed positioning signals were observed through the operation of one or more sensors (or antenna) of a mobile apparatus. The apparatus accesses an instance of positioning index information corresponding to a geographic area within which the mobile apparatus is located; and identifies, based at least in part on the instance of positioning index information and capabilities of the mobile apparatus, one or more positioning approaches. The apparatus identifies at least one positioning signal of the one or more observed positioning signals that corresponds to the one or more positioning approaches; and uses the at least one positioning signal and at least one of the one or more positioning approaches to perform a positioning and/or navigation-related function.

According to a first aspect, a method for generating and providing at least one instance of position index information is provided. In an example embodiment, the method is performed by at least one apparatus and comprises obtaining a plurality of instances of positioning quality information. Each instance of positioning quality information comprises a respective position estimate, a respective positioning approach indicator configured to identify the positioning approach used to determine the position estimate, and a respective characteristic for the respective position estimate. The method further comprises partitioning the plurality of instances of positioning quality information into a plurality of groups and a plurality of clusters, each group of the plurality of groups having multiple clusters of the plurality of clusters associated therewith. The plurality of instances of positioning quality information are partitioned into the plurality of groups based on the respective position estimates in the plurality of instances of positioning quality information and the plurality of instances of positioning quality information are partitioned into the plurality of clusters based on the respective positioning approach indicators in the plurality of instances of positioning quality information. The method further comprises, for each respective cluster of each respective group, determining a respective positioning index based at least in part on respective characteristics of the respective instances of positioning quality information assigned to the respective cluster. The method further comprises providing at least one instance of positioning index information. The at least one instance of positioning index information comprises one or more of (i) a geographic area identifier identifying the respective geographic area corresponding to the respective group, (ii) at least one positioning index, or (iii) a positioning approach identifier identifying the respective positioning approach corresponding to the at least one positioning index.

In an example embodiment, a grid of positioning index information comprising a plurality of instances of positioning index information (including the at least one instance of positioning index information) is provided such that a respective position in the grid corresponds to the respective geographic area and each instance of positioning index information of the plurality of instances of positioning index information comprises at least one of (i) at least one positioning index or (ii) a positioning approach identifier identifying the respective positioning approach corresponding to the at least one positioning index.

In an example embodiment, a first instance of positioning quality information comprising a first position estimate is assigned to a first group responsive to the first position estimate being located within a first geographic area, the first geographic area corresponding to the first group, and the first instance of positioning quality information is assigned to a first cluster of the first group responsive to the respective positioning approach of the first instance of positioning quality information matching a first positioning approach corresponding to the first cluster.

In an example embodiment, the at least one instance of positioning index information is configured to cause a mobile device to perform a positioning or navigation-related function within the geographic area corresponding to the respective group based at least in part on respective positioning index.

In an example embodiment, respective positioning index for the respective cluster of the respective group is determined based on a statistical distribution of the respective characteristics of the respective instances of positioning quality information assigned to the respective cluster of the respective group.

In an example embodiment, the respective characteristics comprises at least one of an uncertainty of the respective position estimate, a number of signal sources observed by a probe device for at least one positioning approach at the location indicated by the respective position estimate, or at least one signal strength value for at least one of the signal sources observed by the probe device for the at least one positioning type at the location indicated by the respective position estimate.

In an example embodiment, the probe device is a mobile computing apparatus that generated the respective instance of positioning quality information.

In an example embodiment, the respective positioning index is determined as a function of at least a portion of the respective characteristics of the respective instances of positioning quality information assigned to the respective cluster of the respective group.

In an example embodiment, the respective positioning index is determined by a machine-learning trained model configured to receive at least one of the respective characteristics of the respective instances of positioning quality information assigned to the respective cluster of the respective group or a statistical representation of a distribution of the respective characteristics of the respective instances of positioning quality information assigned to the respective cluster of the respective group as input and provide an indication of a positioning index value as output.

In an example embodiment, the positioning index is one of a numerical value or a classification.

In an example embodiment, the method further comprises processing respective positioning indices for the respective cluster of a respective group to determine an instance of positioning index information for the respective geographic area, the instance of positioning index information comprising at least one of (i) a positioning approach hierarchy or (ii) a set of positioning approach weights for use in positioning or navigation-related functions within the respective geographic area.

In an example embodiment, the positioning index information provides at least one of (i) the positioning approach hierarchy or (ii) the set of positioning approach weights for the respective group.

In an example embodiment, the at least one instance of positioning index information is (a) provided as at least a portion of a look-up table or (b) is incorporated into one or more data records of a digital map.

In an example embodiment, the respective geographic areas are defined as a grid of geographic areas.

In an example embodiment, a plurality of grids of geographic areas are defined, with each grid defining a set of respective geographic areas of different sizes.

According to another aspect, an apparatus (e.g., a network apparatus) is provided. In an example embodiment, the network apparatus comprises at least one processor, a communications interface configured for communicating via at least one network, and at least one memory storing computer program code. The at least one memory and the computer program code are configured to, with the processor, cause the network apparatus to at least obtain a plurality of instances of positioning quality information. Each instance of positioning quality information comprises a respective position estimate, a respective positioning approach indicator configured to identify the positioning approach used to determine the position estimate, and a respective characteristic for the respective position estimate. The at least one memory and the computer program code are further configured to, with the processor, cause the network apparatus to partition the plurality of instances of positioning quality information into a plurality of groups and a plurality of clusters, each group of the plurality of groups having multiple clusters of the plurality of clusters associated therewith. The plurality of instances of positioning quality information are partitioned into the plurality of groups based on the respective position estimates in the plurality of instances of positioning quality information and the plurality of instances of positioning quality information are partitioned into the plurality of clusters based on the respective positioning approach indicators in the plurality of instances of positioning quality information. The at least one memory and the computer program code are further configured to, with the processor, cause the network apparatus to, for each respective cluster of each respective group, determine a respective positioning index based at least in part on respective characteristics of the respective instances of positioning quality information assigned to the respective cluster. The at least one memory and the computer program code are further configured to, with the processor, cause the network apparatus to provide at least one instance of positioning index information. The at least one instance of positioning index information comprises one or more of (i) a geographic area identifier identifying the respective geographic area corresponding to the respective group, (ii) at least one positioning index, or (iii) a positioning approach identifier identifying the respective positioning approach corresponding to the at least one positioning index.

In an example embodiment, a grid of positioning index information comprising a plurality of instances of positioning index information (including the at least one instance of positioning index information) is provided such that a respective position in the grid corresponds to the respective geographic area and each instance of positioning index information of the plurality of instances of positioning index information comprises at least one of (i) at least one positioning index or (ii) a positioning approach identifier identifying the respective positioning approach corresponding to the at least one positioning index.

In an example embodiment, a first instance of positioning quality information comprising a first position estimate is assigned to a first group responsive to the first position estimate being located within a first geographic area, the first geographic area corresponding to the first group, and the first instance of positioning quality information is assigned to a first cluster of the first group responsive to the respective positioning approach of the first instance of positioning quality information matching a first positioning approach corresponding to the first cluster.

In an example embodiment, the at least one instance of positioning index information is configured to cause a mobile device to perform a positioning or navigation-related function within the geographic area corresponding to the respective group based at least in part on respective positioning index.

In an example embodiment, respective positioning index for the respective cluster of the respective group is determined based on a statistical distribution of the respective characteristics of the respective instances of positioning quality information assigned to the respective cluster of the respective group.

In an example embodiment, the respective characteristics comprises at least one of an uncertainty of the respective position estimate, a number of signal sources observed by a probe device for at least one positioning approach at the location indicated by the respective position estimate, or at least one signal strength value for at least one of the signal sources observed by the probe device for the at least one positioning type at the location indicated by the respective position estimate.

In an example embodiment, the probe device is a mobile computing apparatus that generated the respective instance of positioning quality information.

In an example embodiment, the respective positioning index is determined as a function of at least a portion of the respective characteristics of the respective instances of positioning quality information assigned to the respective cluster of the respective group.

In an example embodiment, the respective positioning index is determined by a machine-learning trained model configured to receive at least one of the respective characteristics of the respective instances of positioning quality information assigned to the respective cluster of the respective group or a statistical representation of a distribution of the respective characteristics of the respective instances of positioning quality information assigned to the respective cluster of the respective group as input and provide an indication of a positioning index value as output.

In an example embodiment, the positioning index is one of a numerical value or a classification.

In an example embodiment, the at least one memory and the computer program code are further configured to, with the processor, cause the network apparatus to process respective positioning indices for the respective cluster of a respective group to determine an instance of positioning index information for the respective geographic area, the instance of positioning index information comprising at least one of (i) a positioning approach hierarchy or (ii) a set of positioning approach weights for use in positioning or navigation-related functions within the respective geographic area.

In an example embodiment, the positioning index information provides at least one of (i) the positioning approach hierarchy or (ii) the set of positioning approach weights for the respective group.

In an example embodiment, the at least one instance of positioning index information is (a) provided as at least a portion of a look-up table or (b) is incorporated into one or more data records of a digital map.

In an example embodiment, the respective geographic areas are defined as a grid of geographic areas.

In an example embodiment, a plurality of grids of geographic areas are defined, with each grid defining a set of respective geographic areas of different sizes.

According to still another aspect, a computer program product is provided. In an example embodiment, the computer program product comprises at least one non-transitory computer-readable storage medium having computer-readable program code portions stored therein. The computer-readable program code portions comprise executable portions configured, when executed by a processor of an apparatus (e.g., a network apparatus), to cause the apparatus to obtain a plurality of instances of positioning quality information. Each instance of positioning quality information comprises a respective position estimate, a respective positioning approach indicator configured to identify the positioning approach used to determine the position estimate, and a respective characteristic for the respective position estimate. The computer-readable program code portions comprise executable portions further configured, when executed by a processor of the apparatus, to cause the apparatus to partition the plurality of instances of positioning quality information into a plurality of groups and a plurality of clusters, each group of the plurality of groups having multiple clusters of the plurality of clusters associated therewith. The plurality of instances of positioning quality information are partitioned into the plurality of groups based on the respective position estimates in the plurality of instances of positioning quality information and the plurality of instances of positioning quality information are partitioned into the plurality of clusters based on the respective positioning approach indicators in the plurality of instances of positioning quality information. The computer-readable program code portions comprise executable portions further configured, when executed by a processor of the apparatus, to, for each respective cluster of each respective group, determine a respective positioning index based at least in part on respective characteristics of the respective instances of positioning quality information assigned to the respective cluster. The computer-readable program code portions comprise executable portions further configured, when executed by a processor of the apparatus, to provide at least one instance of positioning index information. The at least one instance of positioning index information comprises one or more of (i) a geographic area identifier identifying the respective geographic area corresponding to the respective group, (ii) at least one positioning index, or (iii) a positioning approach identifier identifying the respective positioning approach corresponding to the at least one positioning index.

In an example embodiment, a grid of positioning index information comprising a plurality of instances of positioning index information (including the at least one instance of positioning index information) is provided such that a respective position in the grid corresponds to the respective geographic area and each instance of positioning index information of the plurality of instances of positioning index information comprises at least one of (i) at least one positioning index or (ii) a positioning approach identifier identifying the respective positioning approach corresponding to the at least one positioning index.

In an example embodiment, a first instance of positioning quality information comprising a first position estimate is assigned to a first group responsive to the first position estimate being located within a first geographic area, the first geographic area corresponding to the first group, and the first instance of positioning quality information is assigned to a first cluster of the first group responsive to the respective positioning approach of the first instance of positioning quality information matching a first positioning approach corresponding to the first cluster.

In an example embodiment, the at least one instance of positioning index information is configured to cause a mobile device to perform a positioning or navigation-related function within the geographic area corresponding to the respective group based at least in part on respective positioning index.

In an example embodiment, respective positioning index for the respective cluster of the respective group is determined based on a statistical distribution of the respective characteristics of the respective instances of positioning quality information assigned to the respective cluster of the respective group.

In an example embodiment, the respective characteristics comprises at least one of an uncertainty of the respective position estimate, a number of signal sources observed by a probe device for at least one positioning approach at the location indicated by the respective position estimate, or at least one signal strength value for at least one of the signal sources observed by the probe device for the at least one positioning type at the location indicated by the respective position estimate.

In an example embodiment, the probe device is a mobile computing apparatus that generated the respective instance of positioning quality information.

In an example embodiment, the respective positioning index is determined as a function of at least a portion of the respective characteristics of the respective instances of positioning quality information assigned to the respective cluster of the respective group.

In an example embodiment, the respective positioning index is determined by a machine-learning trained model configured to receive at least one of the respective characteristics of the respective instances of positioning quality information assigned to the respective cluster of the respective group or a statistical representation of a distribution of the respective characteristics of the respective instances of positioning quality information assigned to the respective cluster of the respective group as input and provide an indication of a positioning index value as output.

In an example embodiment, the positioning index is one of a numerical value or a classification.

In an example embodiment, the computer-readable program code portions comprise executable portions further configured, when executed by a processor of the apparatus, to process respective positioning indices for the respective cluster of a respective group to determine an instance of positioning index information for the respective geographic area, the instance of positioning index information comprising at least one of (i) a positioning approach hierarchy or (ii) a set of positioning approach weights for use in positioning or navigation-related functions within the respective geographic area.

In an example embodiment, the positioning index information provides at least one of (i) the positioning approach hierarchy or (ii) the set of positioning approach weights for the respective group.

In an example embodiment, the at least one instance of positioning index information is (a) provided as at least a portion of a look-up table or (b) is incorporated into one or more data records of a digital map.

In an example embodiment, the respective geographic areas are defined as a grid of geographic areas.

In an example embodiment, a plurality of grids of geographic areas are defined, with each grid defining a set of respective geographic areas of different sizes.

According to yet another aspect, an apparatus is provided. In an example embodiment, the apparatus comprises means for obtaining a plurality of instances of positioning quality information. Each instance of positioning quality information comprises a respective position estimate, a respective positioning approach indicator configured to identify the positioning approach used to determine the position estimate, and a respective characteristic for the respective position estimate. The apparatus comprises means for partitioning the plurality of instances of positioning quality information into a plurality of groups with each group of the plurality of groups corresponding to a respective geographic area. A first instance of positioning quality information comprising a first position estimate is assigned to a first group responsive to the first position estimate being located within a first geographic area, the first geographic area corresponding to the first group. The apparatus comprises means for, for each respective group of the plurality of groups, partitioning instances of positioning quality information of the respective group into a plurality of positioning approach clusters with each cluster of the plurality of clusters corresponding to respective positioning approach. The first instance of positioning quality information is assigned to a first cluster of the first group responsive to the respective positioning approach of the first instance of positioning quality information matching a first positioning approach corresponding to the first cluster. The apparatus comprises means for, for each respective cluster of each respective group, determining a respective positioning index based at least in part on respective characteristics of the respective instances of positioning quality information assigned to the respective cluster. The apparatus comprises means for providing at least one instance of positioning index information. The at least one instance of positioning index information comprising (i) a geographic area identifier identifying the respective geographic area corresponding to the respective group, (ii) at least one positioning index and (iii) a positioning approach identifier identifying the respective positioning approach corresponding to the at least one positioning index.

According to another aspect, a method for performing a positioning and/or navigation-related function by an apparatus is provided. In an example embodiment, the method comprises obtaining one or more observed positioning signals. The observed positioning signals were observed through the operation of one or more sensors (or antenna) of a mobile apparatus. The method further comprises accessing an instance of positioning index information corresponding to a geographic area within which the mobile apparatus is located; identifying, based at least in part on the instance of positioning index information and capabilities of the mobile apparatus, one or more positioning approaches; identifying at least one positioning signal of the one or more observed positioning signals that corresponds to the one or more positioning approaches; and using the at least one positioning signal and at least one of the one or more positioning approaches to perform a positioning and/or navigation-related function.

According to still another aspect, an apparatus (e.g., a mobile apparatus) is provided. In an example embodiment, the network apparatus comprises at least one processor, a communications interface configured for communicating via at least one network, and at least one memory storing computer program code. The at least one memory and the computer program code are configured to, with the processor, cause the apparatus to at least obtain one or more observed positioning signals. The observed positioning signals were observed through the operation of one or more sensors of a mobile apparatus. The at least one memory and the computer program code are further configured to, with the processor, cause the apparatus to at least access an instance of positioning index information corresponding to a geographic area within which the mobile apparatus is located; identify, based at least in part on the instance of positioning index information and capabilities of the mobile apparatus, one or more positioning approaches; identify at least one positioning signal of the one or more observed positioning signals that corresponds to the one or more positioning approaches; and use the at least one positioning signal and at least one of the one or more positioning approaches to perform a positioning and/or navigation-related function.

According to yet another aspect, a computer program product is provided. In an example embodiment, the computer program product comprises at least one non-transitory computer-readable storage medium having computer-readable program code portions stored therein. The computer-readable program code portions comprise executable portions configured, when executed by a processor of an apparatus (e.g., a mobile apparatus), to cause the apparatus to obtain one or more observed positioning signals. The observed positioning signals were observed through the operation of one or more sensors of a mobile apparatus. The computer-readable program code portions comprise executable portions further configured, when executed by a processor of an apparatus, to cause the apparatus to access an instance of positioning index information corresponding to a geographic area within which the mobile apparatus is located; identify, based at least in part on the instance of positioning index information and capabilities of the mobile apparatus, one or more positioning approaches; identify at least one positioning signal of the one or more observed positioning signals that corresponds to the one or more positioning approaches; and use the at least one positioning signal and at least one of the one or more positioning approaches to perform a positioning and/or navigation-related function.

According to another aspect, an apparatus is provided. In an example embodiment, the apparatus comprises means for obtaining one or more observed positioning signals. The observed positioning signals were observed through the operation of one or more sensors of a mobile apparatus. The apparatus comprises means for accessing an instance of positioning index information corresponding to a geographic area within which the mobile apparatus is located. The apparatus comprises means for identifying, based at least in part on the instance of positioning index information and capabilities of the mobile apparatus, one or more positioning approaches. The apparatus comprises means for identifying at least one positioning signal of the one or more observed positioning signals that corresponds to the one or more positioning approaches. The apparatus comprises means for using the at least one positioning signal and at least one of the one or more positioning approaches to perform a positioning and/or navigation-related function.

BRIEF DESCRIPTION OF THE DRAWINGS

Figure 1:
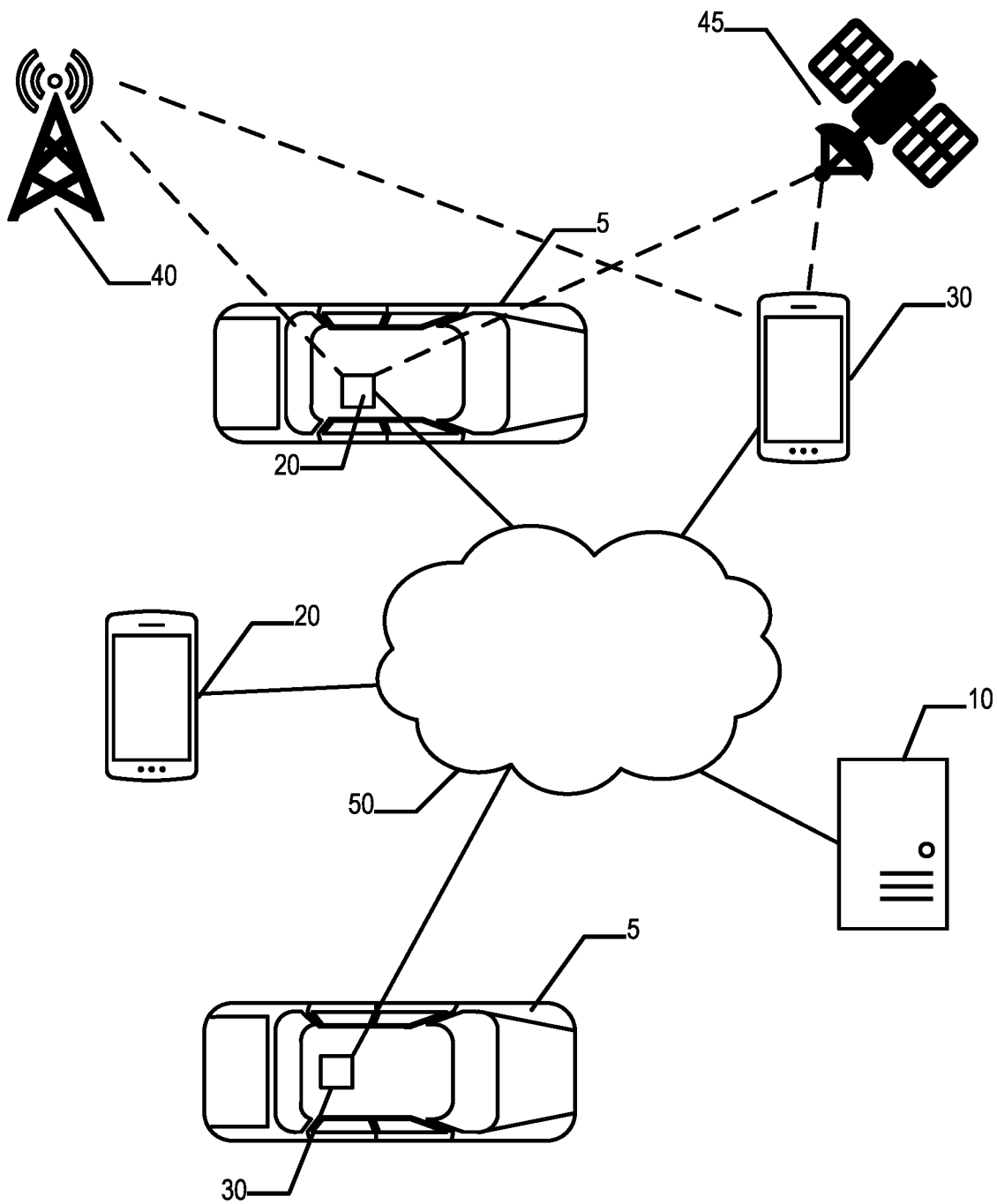
Figure 2A:
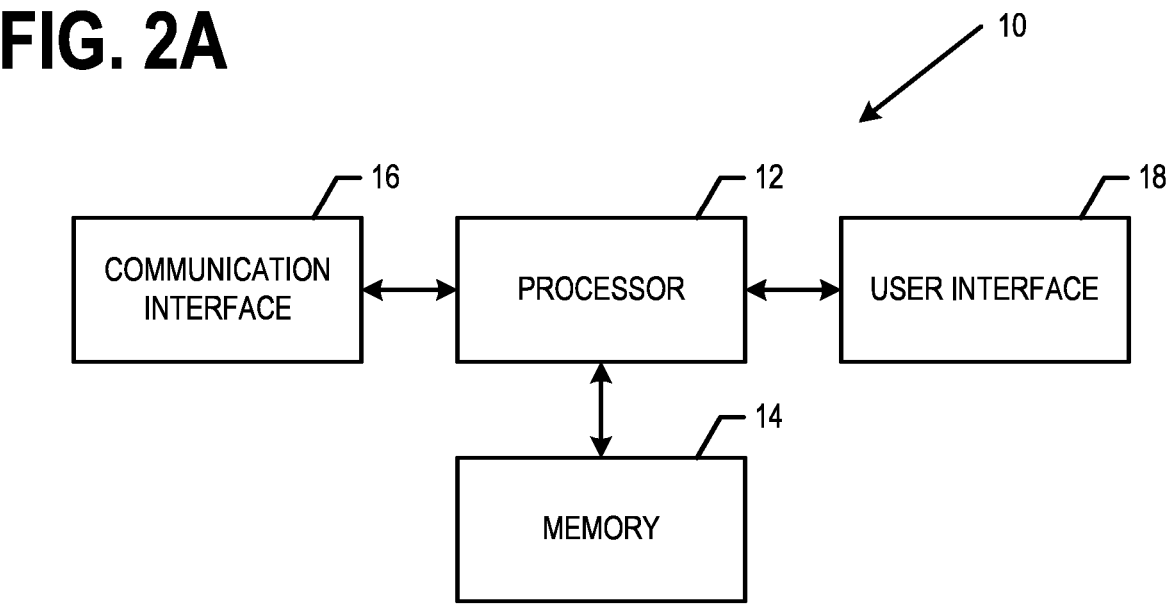
Figure 2B:
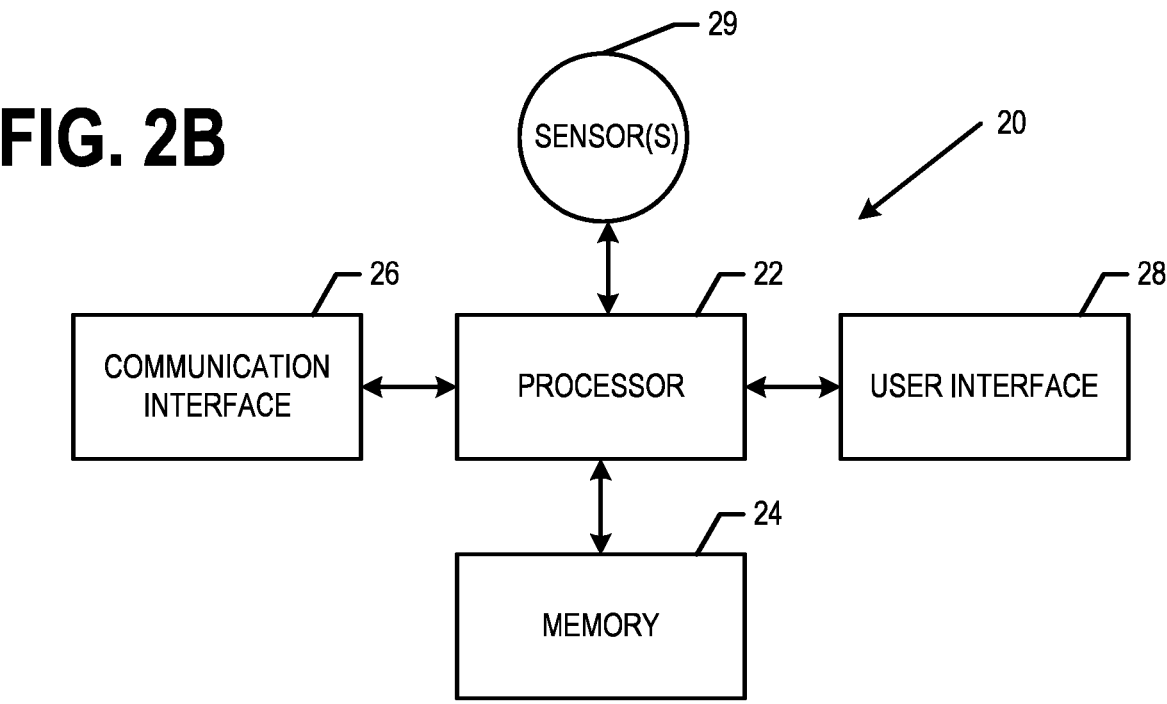
Figure 2C:
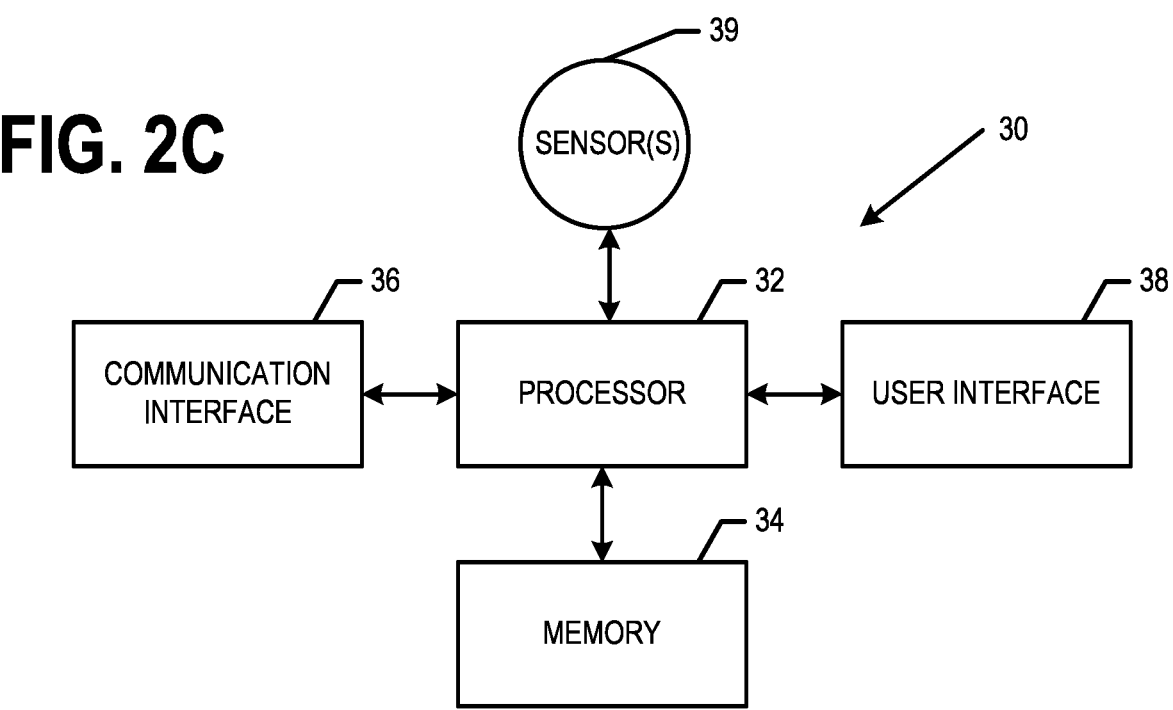
Figure 3:
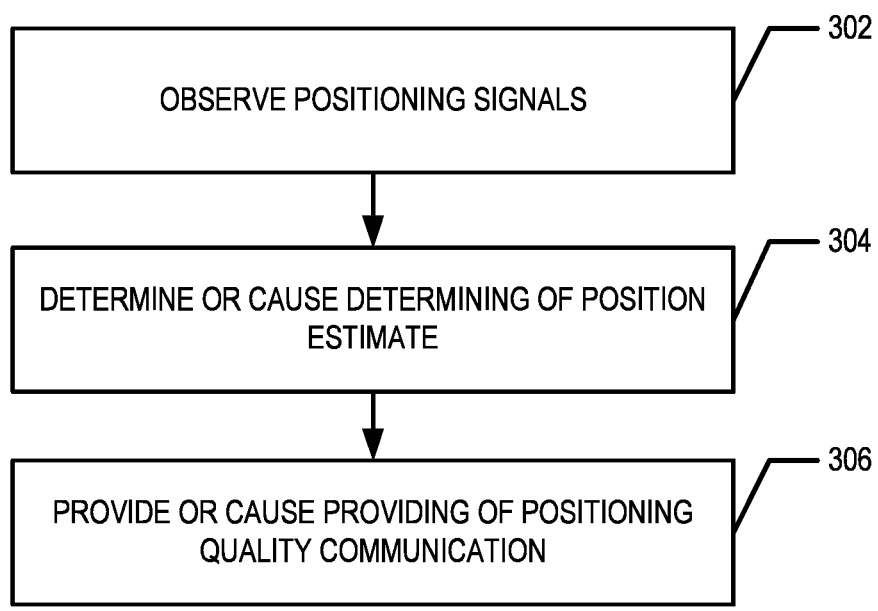
Figure 4:
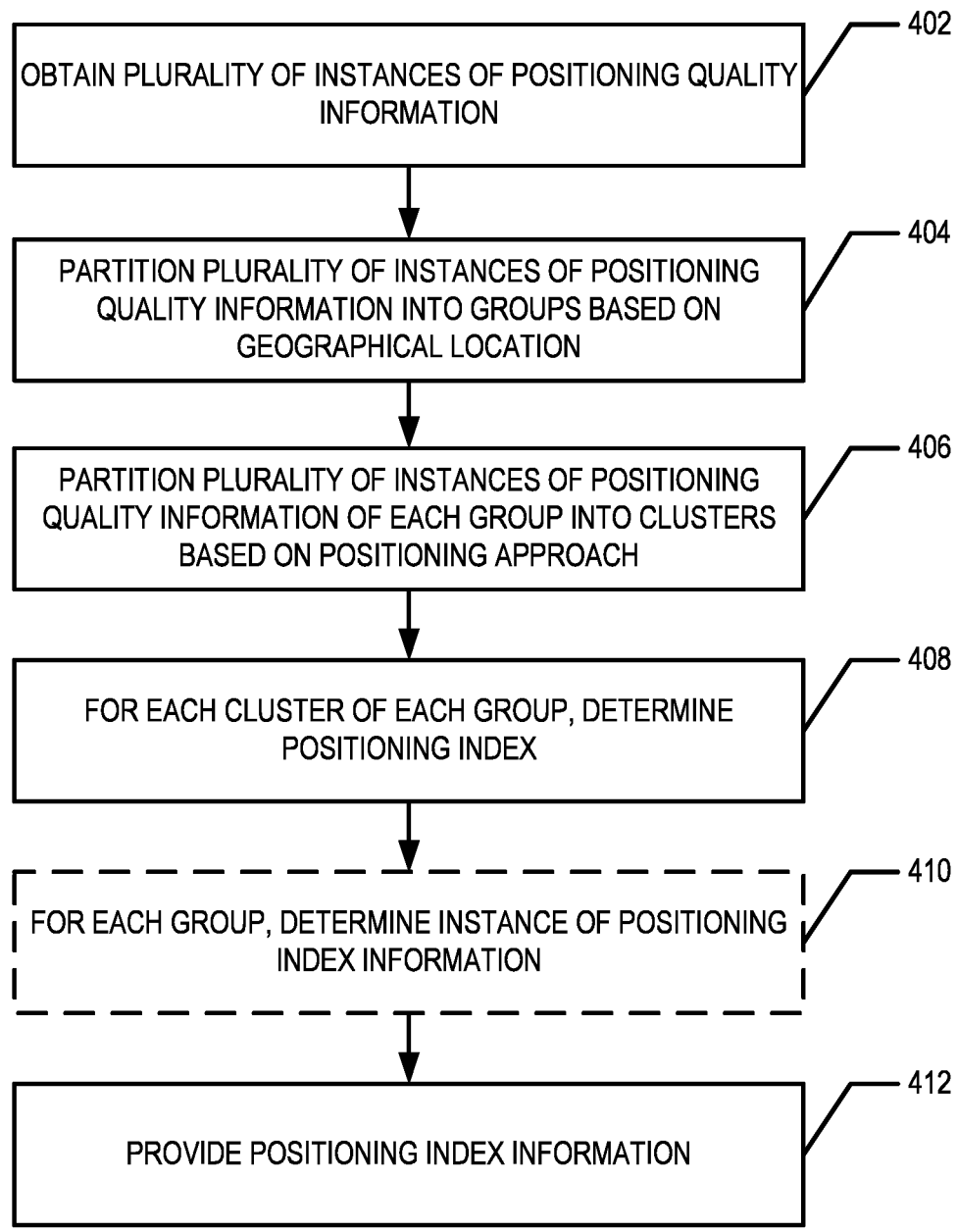
Figure 5:
Figure 6:
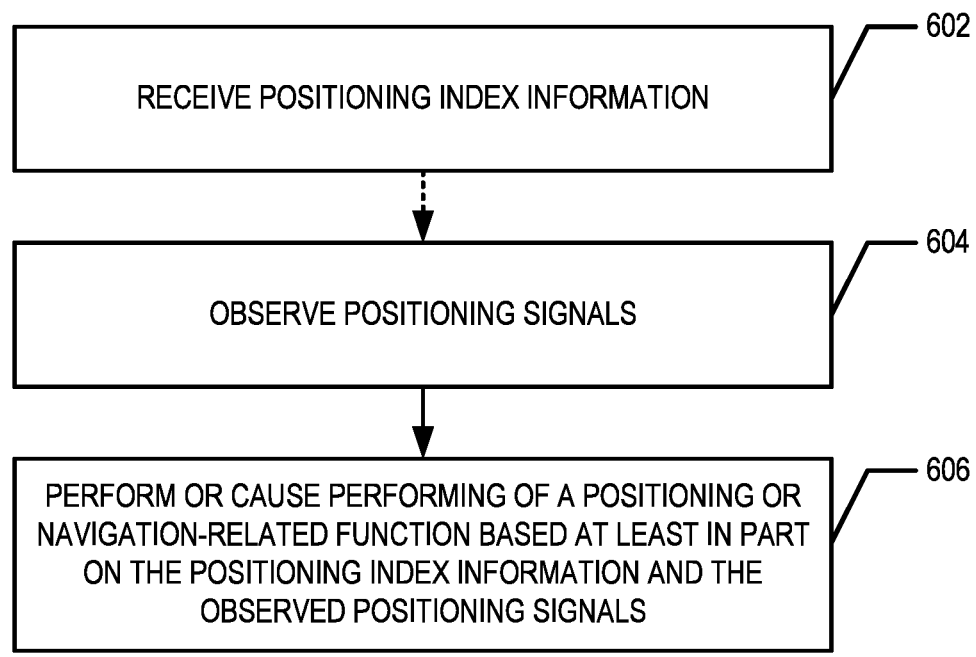

Having thus described certain example embodiments in general terms, reference will hereinafter be made to the accompanying drawings, which are not necessarily drawn to scale, and wherein:

FIG. 1 is a block diagram showing an example architecture of one embodiment of the present invention;

FIG. 2A is a block diagram of a network apparatus that may be specifically configured in accordance with an example embodiment;

FIG. 2B is a block diagram of a probe apparatus that may be specifically configured in accordance with an example embodiment;

FIG. 2C is a block diagram of a mobile apparatus that may be specifically configured in accordance with an example embodiment;

FIG. 3 is a flowchart illustrating operations performed, such as by the probe apparatus of FIG. 2B to provide a positioning quality communication, in accordance with an example embodiment;

FIG. 4 is a flowchart illustrating operations performed, such as by the network apparatus of FIG. 2A to generate and provide and/or cause use of a positioning index information, in accordance with an example embodiment;

FIG. 5 illustrates an example of an instance of positioning index information, in accordance with an example embodiment; and FIG. 6 is a flowchart illustrating operations performed, such as by the mobile apparatus of FIG. 2C to use positioning index information to perform a positioning and/or navigation-related function, in accordance with an example embodiment.

DETAILED DESCRIPTION OF SOME EXAMPLE EMBODIMENTS

Some embodiments will now be described more fully hereinafter with reference to the accompanying drawings, in which some, but not all, embodiments of the invention are shown. Indeed, various embodiments of the invention may be embodied in many different forms and should not be construed as limited to the embodiments set forth herein; rather, these embodiments are provided so that this disclosure will satisfy applicable legal requirements. The term "or" (also denoted "/") is used herein in both the alternative and conjunctive sense, unless otherwise indicated. The terms "illustrative" and "exemplary" are used to be examples with no indication of quality level. Like reference numerals refer to like elements throughout. As used herein, the terms "data," "content," "information," and similar terms may be used interchangeably to refer to data capable of being transmitted, received and/or stored in accordance with embodiments of the present invention. As used herein, the terms "substantially" and "approximately" refer to values that are within manufacturing and/or engineering guidelines and/or limits. Thus, use of any such terms should not be taken to limit the spirit and scope of embodiments of the present invention.

Additionally, as used herein, the term 'circuitry' refers to (a) hardware-only circuit implementations (e.g., implementations in analog circuitry and/or digital circuitry); (b) combinations of circuits and computer program product(s) comprising software and/or firmware instructions stored on one or more computer readable memories that work together to cause an apparatus to perform one or more functions described herein; and (c) circuits, such as, for example, a microprocessor(s) or a portion of a microprocessor(s), that require software or firmware for operation even if the software or firmware is not physically present. This definition of 'circuitry' applies to all uses of this term herein, including in any claims. As a further example, as used herein, the term 'circuitry' also includes an implementation comprising one or more processors and/or portion(s) thereof and accompanying software and/or firmware.

I. General Overview

Methods, apparatus, computer program products, systems, and/or the like for generating positioning index information for various geographic areas and/or making use of positioning index information to perform positioning and/or navigation-related functions are provided.

In various embodiments, a network apparatus crowd-sources a plurality of instances of positioning quality information. For example, one or more probe apparatuses observe respective positioning signals. In various embodiments, the positioning signals are navigation satellite signals (e.g., global navigation satellite system (GNSS) signals), radio node and/or access point signals (e.g., Bluetooth, Wi-Fi, cellular, and/or other radio frequency network signals), images captured by imaging sensors (e.g., cameras, Lidars, radars and/or the like associated with the probe apparatus), motion signals (e.g., captured by inertial measurement unit sensors, accelerometers, gyroscopes, step counters, magnet field sensors, pressure sensors/barometers, and/or other sensors configured to detect movement and/or change in position of the probe apparatus), and/or other positioning signals. A position estimate of the mobile apparatus is generated and/or determined (e.g., by the mobile apparatus, a Cloud-based positioning service, a positioning server, and/or the like). One or more characteristics of the position estimate may also be determined. The one or more characteristics of the position estimate may include a measure of uncertainty of the position estimate; characteristics of the positioning signals on which the position estimate was determined such as the number of positioning signals observed, the signal strength of the observed positioning signals, and/or the like; and/or various other characteristics of the positioning signals that indicate how the position estimate was determined. An instance of positioning quality information is generated that includes the position estimate and/or an approximation thereof, a positioning approach indicator configured to identify the positioning approach used to determine the position estimate, and one or more characteristics of the position estimate. A positioning quality communication comprising the instance of positioning quality information is then provided (e.g., by the probe apparatus, Cloud-based positioning service, positioning server, and/or the like) such that the network apparatus receives the positioning quality communication.

The network apparatus obtains a plurality of instances of positioning quality information and processes the plurality of instances of positioning quality information to determine positioning index information for various geographic areas and various positioning approaches. For example, the network apparatus may receive a plurality of positioning quality communications each comprising one or more instances of positioning quality information and/or access instances of positioning quality information stored in a memory accessible to the network apparatus. The network apparatus is configured to partition, group, and/or separate the plurality of instances of positioning quality information into a plurality of groups that each correspond to a respective geographic area. For example, all of the instances of positioning quality information that correspond to a particular geographic area are assigned to the same group. For each group of the plurality of groups, the instances of positioning quality information are partitioned, clustered, and/or separated into clusters that each correspond to a respective positioning approach. Some non-limiting examples of positioning approaches are navigation satellite-based (e.g., GNSS-based), received radio signal (RSS) radio-based, timing parameter (e.g., round-trip-timing) radio-based, motion-based, visual odometry-based. For example, all of the instances of positioning quality information of a particular group that correspond to a particular positioning approach (comprise a same or equivalent positioning approach identifier) are assigned to the same cluster. The characteristics of the respective position estimates of the instances of positioning quality information of each cluster are processed to determine positioning index information corresponding to the respective positioning approach in the respective geographic area.

In various embodiments, the positioning index information provides the positioning approach hierarchy and/or the set of positioning approach weights for the respective group. In an example embodiment, the positioning approach hierarchy is configured to indicate at least a first positioning approach for the geographic area. For example, the positioning index information may provide and/or indicate a first positioning approach for a geographic area. For example, the first positioning approach for the geographic area is the positioning approach that is expected to provide the most accurate, most dependable, and/or most usable position estimate. For example, the first positioning approach for the geographic area is expected to be the most accurate and/or least likely manipulated positioning approach for the geographic area, in an example embodiment.

In an example embodiment, the positioning approach hierarchy is configured to further indicate a second positioning approach, wherein the second positioning approach is expected to provide the second most accurate, most dependable, and/or most usable position estimate (e.g., after the first positioning approach). For example, the first positioning approach for the geographic area is expected to be the second most accurate and/or least likely manipulated positioning approach (e.g., after the first positioning approach) for the geographic area, in an example embodiment. For example, if the first positioning approach is not available to a mobile apparatus (e.g., the first positioning approach is a GNSS-based positioning approach and the mobile apparatus does not include and/or is not coupled to a functioning GNSS receiver/sensor), the mobile apparatus may determine to use the second positioning approach to determine a position estimate in the geographic area. The positioning approach hierarchy may be configured to further indicate third, fourth, and/or additional positioning approaches ordered based on the expected accuracy, dependability, usability, and/or the like of the respective positioning approaches in the geographic area.

In various embodiments, the set of positioning approach weights for the respective group provides and/or indicates weights to be used for using a hybrid positioning approach within the geographic area. In various embodiments, performing a hybrid positioning approach comprises determining at least two position estimates using at least two different positioning approaches and/or at least two different sets of observed positioning signals. The at least two position estimates are combined and/or aggregated into a hybrid position estimate. In an example embodiment, the at least two position estimates are combined and/or aggregated into the hybrid position estimate by averaging or determining a weighted average of the at least two position estimates. The set of positioning approach weights provide the weights to be used in determining the weighted average of the at least two position estimates to determine the hybrid position estimate within the respective geographic area. In various embodiments, the hybrid positioning approach may use a variety of techniques for combining positioning signal observations and/or position estimates corresponding to multiple positioning approaches based at least in part on the positioning approach weights.

The network apparatus may use or provide for another apparatus to use (e.g., a mobile apparatus, a Cloud-based positioning service, a positioning server, and/or the like) at least one instance of positioning index information. In an example embodiment, an instance of positioning index information comprises the positioning index information corresponding to a respective geographic area. In various embodiments, the instance of the positioning index information for a respective geographic area is used to determine which positioning approach(es) to use in a particular geographic area. For example, the instance of positioning index information for respective geographic area is used to determine which positioning approach to use when determining a position estimate for a mobile apparatus located within the geographic area. In another example, the positioning index information is used to determine how to combine at least two position estimates to generate a hybrid position estimate for a mobile apparatus located within the geographic area.

For example, the instance of positioning index information for the geographic area controls the performance of positioning and/or navigation-related functions and/or causes positioning and/or navigation-related functions to be performed based at least in part on particular positioning approach(es) and/or positioning signals of the particular positioning approach(es) for at least one mobile apparatus located within the geographic area, in various embodiments. Some non-limiting examples of positioning and/or navigation-related functions include determination of positioning estimates, localization, route determination, lane level route determination, operating a vehicle along a lane level route, route travel time determination, lane maintenance, route guidance, lane level route guidance, provision of traffic information/data, provision of lane level traffic information/data, vehicle trajectory determination and/or guidance, vehicle speed and/or handling control, route and/or maneuver visualization, and/or the like.

II. Example Architecture

FIG. 1 provides an illustration of an example system that can be used in conjunction with various embodiments of the present invention. As shown in FIG. 1, the system may include one or more network apparatuses 10, one or more probe apparatuses 20, one or more mobile apparatuses 30, one or more networks 50, and/or the like. In various embodiments, a probe apparatus 20 and/or a mobile apparatus 30 may be onboard a vehicle 5. In various embodiments, a probe apparatus 20 and/or mobile apparatus 30 is configured to observe (e.g., receive, capture, measure, and/or the like) positioning signals and/or other (radio frequency) signals emitted, broadcasted, transmitted, and/or generated by a radio node and/or access point 40, GNSS satellite 45, and/or the like.

In various embodiments, the probe apparatus 20 and/or mobile apparatus 30 may be an in vehicle navigation system, vehicle control system, a mobile computing device, a mobile data gathering platform, and/or the like. For example, a probe apparatus 20 and/or mobile apparatus 30 may be an in vehicle navigation system mounted within and/or be onboard a vehicle 5 such as a motor vehicle, non-motor vehicle, automobile, car, scooter, truck, van, bus, motorcycle, bicycle, Segway, golf cart, and/or the like. In an example embodiment, the probe apparatus 20 and/or mobile apparatus 30 may be a vehicle control system configured to autonomously drive a vehicle 5, assist in control of a vehicle 5, monitor various aspects of the vehicle 5 (e.g., fault conditions, motor oil status, battery charge level, fuel tank fill level, and/or the like) and/or the like. In various embodiments, the probe apparatus 20 and/or mobile apparatus 30 is configured to autonomously drive a vehicle 5 may perform multiple functions that are similar to those performed by a probe apparatus 20 and/or mobile apparatus 30 configured to be an ADAS (e.g., lane keeping, lane change assistance, maintaining a lane, merging, etc.). In some embodiments, a probe apparatus 20 and/or mobile apparatus 30 may be onboard a personal vehicle, commercial vehicle, public transportation vehicle, fleet vehicle, and/or other vehicle.

In various embodiments, the probe apparatus 20 and/or mobile apparatus 30 may be a smartphone, tablet, personal digital assistant (PDA), personal computer, desktop computer, laptop, and/or other mobile computing device. In an example embodiment, the probe apparatus 20 are onboard fleet vehicles and comprise a mobile data gathering platform. In an example embodiment, a mobile apparatus 30 is onboard a vehicle 5 and is used to perform one or more navigation functions corresponding to the vehicle 5 traversing at least a portion of a road network.

In an example embodiment, the network apparatus 10 is a server, group of servers, distributed computing system, and/or other computing system. In an example embodiment, the network apparatus 10 are not located onboard a vehicle. For example, the network apparatus 120 may be located remotely with respect to a probe apparatus 20 and/or mobile apparatus 30. For example, the network apparatus 10 may be in communication with one or more probe apparatuses 20, one or more mobile apparatuses 30, and/or the like via one or more wired or wireless networks 50.

In an example embodiment, a network apparatus 10 may comprise components similar to those shown in the example network apparatus 10 diagrammed in FIG. 2A. In an example embodiment, the network apparatus 10 is configured to receive, access, and/or obtain instances of positioning quality information, generate and provide instances of positioning index information, and/or the like. For example, as shown in FIG. 2A, the network apparatus 10 may comprise a processor 12, memory 14, a user interface 18, a communications interface 16, and/or other components configured to perform various operations, procedures, functions or the like described herein. In at least some example embodiments, the memory 14 is non-transitory. In an example embodiment, the processor 12 may comprise one or more central processing units (CPUs) and one or more graphics processing units (GPUs).

In an example embodiment, a probe apparatus 20 is configured to observe, capture, receive, and/or the like positioning signals for use in determining a position estimate using one or more positioning approaches. In an example embodiment, the probe apparatus 20 is configured to determine and/or cause determining of a position estimate based on at least some of the observed, captured, received, and/or the like positioning signals and to determine and/or cause determining of one or more characteristics of a position estimate. In various embodiments, the probe apparatus 20 is configured to generate and provide (e.g., transmit) and/or cause generation and provision of one or more instances of positioning quality information such that a network apparatus 10 receives the one or more instances of positioning quality information.

In an example embodiment, as shown in FIG. 2B, the probe apparatus 20 may comprise a processor 22, memory 24, a communications interface 26, a user interface 28, one or more sensors 29 (e.g., a location sensor such as a GNSS sensor/receiver; one or more radio interfaces (e.g., Bluetooth interface, Wi-Fi interface, cellular interface, and/or the like); IMU sensors; camera(s); image sensors; two dimensional (2D) and/or three dimensional (3D) light detection and ranging (LiDAR)(s); long, medium, and/or short range radio detection and ranging (RADAR); ultrasonic sensors; electromagnetic sensors; (near-) infrared (IR) cameras; 3D cameras; 3600 cameras; fuel level sensors; vehicle system sensors (e.g., oil status sensors, tire pressure sensors, engine oil pressure sensors, coolant level sensors, engine/coolant temperature sensors, and/or other sensors that enable the probe apparatus 20 to determine one or more features of the probe apparatus's 20 surroundings and/or monitor a vehicle's 5 operating parameters), and/or other components configured to perform various operations, procedures, functions or the like described herein. In at least some example embodiments, the memory 24 is non-transitory.

In an example embodiment, the mobile apparatus 30 may be configured to receive one or more instances of positioning index information (e.g., possibly as part of a digital map and/or one or more digital map tiles) and use at least a portion of the one or more instances of positioning index information to perform one or more positioning and/or navigation-related functions (e.g., within a geographic area corresponding to the instance of positioning index information). In an example embodiment, as shown in FIG. 2C, the mobile apparatus 30 may comprise a processor 32, memory 34, a communications interface 36, a user interface 38, one or more sensors 39 (e.g., a location sensor such as a GNSS sensor/receiver; one or more radio interfaces (e.g., Bluetooth interface, Wi-Fi interface, cellular interface, and/or the like); IMU sensors; camera(s); image sensors; two dimensional (2D) and/or three dimensional (3D) light detection and ranging (LiDAR)(s); long, medium, and/or short range radio detection and ranging (RADAR); ultrasonic sensors; electromagnetic sensors; (near-) infrared (IR) cameras; 3D cameras; 3600 cameras; fuel level sensors; vehicle system sensors (e.g., oil status sensors, tire pressure sensors, engine oil pressure sensors, coolant level sensors, engine/coolant temperature sensors, and/or other sensors that enable the mobile apparatus 30 to determine one or more features of the mobile apparatus's 30 surroundings and/or monitor a vehicle's 5 operating parameters), and/or other components configured to perform various operations, procedures, functions or the like described herein. In at least some example embodiments, the memory 34 is non-transitory. In various embodiments, a probe apparatus 20 may also be a mobile apparatus 30.

In an example embodiment, the network apparatus 10 may be in communication with one or more of probe apparatuses 20, one or more mobile apparatuses 30, and/or other computing entities. In an example embodiment, the network apparatus 10 may generate and/or provide one or more instances of positioning index information each corresponding to a respective geographic area. In various embodiments, an instance of positioning index information corresponding to a respective geographic area provides the positioning approach hierarchy and/or the set of positioning approach weights for the respective geographic area. Though described (e.g., with respect to FIG. 5 as tables herein, instances of positioning index information may be provided in various forms such as tables, flat files, hierarchical formats such as data trees or mark-up language files, queryable databases, and/or the like.

Each of the components of the system may be in electronic communication with, for example, one another over the same or different wireless or wired networks 50 including, for example, a wired or wireless Personal Area Network (PAN), Local Area Network (LAN), Metropolitan Area Network (MAN), Wide Area Network (WAN), cellular network, and/or the like. In some embodiments, a network 50 may comprise the automotive cloud, digital transportation infrastructure (DTI), radio data system (RDS)/high definition (HD) radio or other digital radio system, and/or the like. For example, a probe apparatus 20, mobile apparatus 30, and/or informant apparatus 40 may be in communication with a network apparatus 10 via the network 50. For example, a probe apparatus 20, and/or mobile apparatus 30 may communicate with the network apparatus 10 via a network, such as the Cloud. For example, the Cloud may be a computer network that provides shared computer processing resources and data to computers and other devices connected thereto. For example, the probe apparatus 20 may be configured to provide one or more positioning quality communications via the network 50. For example, the network apparatus 10 may configured to receive a plurality of positioning quality communications and/or provide (e.g., transmit) one or more instances of positioning index information via the network 50. For example, a mobile apparatus 30 may be configured to receive one or more instances of positioning index information and/or digital maps and/or digital maps tiles comprising instances of positioning index information via the network 50.

Certain example embodiments of the network apparatus 10, probe apparatus 20, and/or mobile apparatus 30, are described in more detail below with respect to FIGS. 2A, 2B, and 2C.

III. Example Operation

Various embodiments provide methods, apparatus, computer program products, systems, and/or the like for generating positioning index information for various geographic areas and/or making use of positioning index information to perform positioning and/or navigation-related functions. In various embodiments, a network apparatus crowd-sources a plurality of instances of positioning quality information. The network apparatus processes the plurality of instances of positioning quality information to determine positioning index information for various geographic areas and various positioning approaches. The network apparatus may use or provide for another apparatus to use (e.g., a mobile apparatus, a Cloud-based positioning service, a positioning server, and/or the like) at least a portion of the positioning index information. For example, the positioning index information may be used to determine which positioning approach to use in a particular geographic area. In another example, the positioning index information may be used to determine or may provide weights to be used in a hybrid positioning approach for us in a particular geographic area.

In various embodiments, a geographic region is divided into a grid of geographic areas. For example, the geographic areas are a tiling of a geographic region, in an example embodiment. In an example embodiment, the geographic areas are uniform in size (e.g., length and width), area, and/or volume. In an example embodiment, the geographic areas are determined based at least in part on population density, feature/building density, road segment density, and/or the like within the defined geographic areas. In various embodiments, the geographic region is a city/town, county, state/province, portion of a country, country, portion of a continent, content, and/or the like.

In an example embodiment, multiple grids of geographic areas are defined based on different sized grids. For example, a first grid of first geographic areas are defined as a uniform tiling of the geographic region and a second grid of second geographic areas are defined as a uniform tiling of the geographic region, in an example embodiment. The first geographic areas are larger than the second geographic areas such that the second geographic areas provide a more granular or zoomed in grid of the geographic area than the first geographic areas. In an example embodiment, each first geographic area is formed of a plurality of constituent second geographic areas. For example, the second geographic areas may be defined by dividing the first geographic areas into plurality of smaller geographic areas. In an example embodiment, the length and/or width of the second geographic areas is in a range of 100 meters to 1 kilometer and the length and/or width of the first geographic areas is in a range of 5 to 10 kilometers. In various embodiments, various numbers of grids that have various sizes are defined, as appropriate for the application.

In various embodiments, instances of positioning index information are defined for each geographic area of each grid defined for the geographic region. In an example embodiment, instances of positioning index information are generated for the grid of smallest geographic areas having the smallest dimensions. For example, groups are defined and instances of positioning quality information are assigned to the defined groups based on only the grid of smallest geographic such that each instance of positioning quality information is assigned to only one group. The groups may then be partitioned into clusters and the instances of positioning index information determined based thereon. To determine the instances of positioning index information for a grid of larger geographic areas (e.g., geographic areas that are larger than the smallest geographic areas) the instances of positioning index information of the respective constituent smallest geographic areas that make up the respective larger geographic areas are aggregated, averaged, and/or the like. For example, if a larger geographic area consists of four constituent smallest geographic areas, the instances of positioning index information for the four constituent smallest geographic areas are aggregated, averaged, and/or the like to generated, determine, and/or define the instance of positioning index information for the larger geographic area.

In various embodiments, groups are defined for each geographic area of a plurality of grids such that an instance of positioning quality information is assigned to as many groups as there are grids. The instance of positioning index information for a geographic area may then be determined independently of the instances of positioning index information for the other geographic areas.

Various features of some example embodiments will now be described in more detail.

a. Example Operation of a Probe Apparatus

In various embodiments, a plurality of probe apparatuses 20 generate and provide positioning quality communications that are used for determining positioning indices. In various embodiments, a probe apparatus 20 is configured to determine or cause determining of a position estimate of the probe apparatus 20 periodically, upon user request, responsive to identification of a positioning trigger, and/or the like. In various embodiments, the probe apparatus 20 is a mobile computing entity, such as a smartphone, tablet, vehicle navigation apparatus, and/or the like. In various embodiments, the probe apparatus 20 may move about at least a portion of a geographic region. For example, in some scenarios, a probe apparatus 20 is onboard a vehicle 5 that is traversing at least a portion of a road network located in the geographic region.

In various embodiments, the probe apparatus 20 is configured to observe positioning signals via one or more sensors 29 and determine or cause determining of a position estimate of the probe apparatus 20 based on the observed positioning signals. In various embodiments, one or more sensors 29 are part of and/or are co-located and in communication with the probe apparatus 20. For example, in an example embodiment, the sensors 29 are part of the probe apparatus 20. In another example, the sensors 29 are coupled to a vehicle 5 on which the probe apparatus 20 is located and the probe apparatus 20 is in communication with the sensors 29. In various embodiments, various sensors of the one or more sensors 29 are configured to observe positioning signals. For example, the sensors 29 may comprise a GNSS sensor/receiver and the probe apparatus 20 may observe GNSS positioning signals transmitted by GNSS satellites 45 via the functioning of the GNSS sensor/receiver. A GNSS-based positioning approach may be used to determine a position estimate of the probe apparatus 20 based on the observed GNSS positioning signals.

In another example, the sensors 29 may comprise one or more radio interfaces (e.g., Bluetooth; Wi-Fi; cellular; and/or other radio frequency short, medium, or long range wireless communication protocol interface) such that the probe apparatus 20 is configured to observe radio positioning signals transmitted by radio nodes and/or access points 40 via the functioning of the one or more radio interfaces. A radio-based positioning approach (using received signal strength (RSS) and/or time parameter (e.g., such as round-trip-time (RTT), for example) approaches) may be used to determine a position estimate of the probe apparatus 20 based on the observed radio positioning signals.

In another example, the sensors 29 comprise IMU sensors, accelerometers, gyroscopes, magnetic sensors, barometers/pressure sensors, and/or other sensors configured to detect motion of the probe apparatus 20. The probe apparatus 20 may observe motion positioning signals through the functioning of such IMU and/or motion sensors. A motion-based positioning approach may be used to determine a position estimate of the probe apparatus 20 based on the observed motion positioning signals.

In another example, the sensors 29 comprise one or more cameras, lidars, radars, or other imaging sensors configured to capture image data corresponding to the surroundings of the probe apparatus 20. The probe apparatus 20 may observe visual positioning signals through the functioning of such imaging sensors. A visual odometry-based positioning approach may be used to determine a position estimate of the probe apparatus 20 based on the observed visual positioning signals.

As should be understood, various other positioning approaches may be used in various embodiments that use respective positioning signals to generate and/or determine position estimates for the probe apparatus 20 based at least in part on respective positioning signals observed (e.g., captured, measured, and/or the like) by one or more sensors 29 of the probe apparatus 20.

FIG. 3 provides a flowchart illustrating operations performed, such as by the probe apparatus 20 of FIG. 2B to provide a positioning quality communication comprising an instance of positioning quality information. Starting at block 302, one or more positioning signals are observed. For example, the one or more sensors 29 may observe, capture, measure, and/or the like positioning signals and communicate a characterization of the observed positioning signals to the processor 22 of the probe apparatus 20. For example, the probe apparatus 20 observes positioning signals. For example, the probe apparatus 20 may comprise means, such as the processor 22, memory 24, sensors 29, and/or the like, for observing positioning signals.

At block 304, a position estimate is determined based at least in part on at least some of the observed positioning signals and using a corresponding positioning approach. For example, the probe apparatus 20 may determine a position estimate using a positioning approach and based at least in part on the observed positioning signals. For example, the probe apparatus 20 may comprise means, such as processor 22, memory 24, and/or the like, for determining a position estimate using a positioning approach and based at least in part on the observed positioning signals. For example, a GNSS-based position estimate of the location of the probe apparatus 20 may be generated and/or determined using a GNSS-based positioning approach and based at least in part on observed GNSS positioning signals. For example, a (RSS and/or time parameter) radio-based position estimate of the location of the probe apparatus 20 may be generated and/or determined using a (RSS and/or time parameter) radio-based positioning approach and based at least in part on observed radio positioning signals. For example, a motional position estimate of the location of the probe apparatus 20 may be generated and/or determined using a motion-based positioning approach and based at least in part on observed motion positioning signals. For example, a visual position estimate of the location of the probe apparatus 20 may be generated and/or determined using a visual odometry-based positioning approach and based at least in part on observed visual positioning signals.

In various embodiments, one or more characteristics of the position estimate are also determined based at least in part on the observed positioning signals and the corresponding positioning approach. For example, the probe apparatus 20 may determine one or more characteristics of the position estimate based at least in part on the observed positioning signals and the corresponding positioning approach. For example, the probe apparatus 20 may comprise means, such as processor 22, memory 24, and/or the like, for determining one or more characteristics of the position estimate based at least in part on the observed positioning signals and the corresponding positioning approach. In various embodiments, the one or more characteristics of the position estimate may include one or more of a measure of uncertainty of the position estimate; characteristics of the positioning signals on which the position estimate was determined such as the number of positioning signals observed, the signal strength of the observed positioning signals, and/or the like; and/or various other characteristics of the positioning signals that indicate how the position estimate was determined.

In an example embodiment, the probe apparatus 20 causes the position estimate and/or the one or more characteristics of the position estimate to be determined and/or generated. For example, the probe apparatus 20 may provide a description and/or characterization of the observed positioning signals (e.g., one or more digital images and a possibly a prior position estimate, a description of detected movement of the probe apparatus 20 and a prior position estimate, radio node and/or access point identifiers and signal strengths and/or time parameters of signals transmitted by one or more radio nodes and/or access points 40, ephemeris and/or timing information of one or more GNSS signals, and/or the like). A Cloud-based positioning service and/or a positioning server may then determine the position estimate and/or the one or more characteristics of the position estimate based on the description and/or characterization of the observed positioning signals provided by the probe apparatus 20. For example, receiving and/or processing the description and/or characterization of the observed positioning signals provided by the probe apparatus 20 may cause a Cloud-based positioning service and/or positioning server to generate and/or determine the position estimate and/or the one or more characteristics of the position estimate using a positioning approach and based at least in part on the observed positioning signals. For example, the probe apparatus 20 may comprise means, such as processor 22, memory 24, communication interface 26, and/or the like, for causing the position estimate and/or the one or more characteristics of the position estimate to be determined and/or generated.

At block 306, a positioning quality communication is provided. For example, the probe apparatus 20 may provide a positioning quality communication such that a network apparatus 10 receives the positioning quality communication. For example, the probe apparatus 20 may comprise means, such as processor 22, memory 24, communications interface 26, and/or the like, for providing a positioning quality communication such that the network apparatus 10 receives the positioning quality communication. In various embodiments, a positioning quality communication is a communication comprising one or more instances of positioning quality information. In various embodiments, an instance of positioning quality information comprises a position estimate, a positioning approach indicator configured to identify the positioning approach used to determine the position estimate, and one or more characteristics of the position estimate. In various embodiments, the positioning quality communication may be provided responsive to the positioning quality communication being generated, periodically (e.g., as part of a batch of positioning quality and/or other communications), in a triggered manner (e.g., responsive to determining that the probe apparatus 20 is in communication with a Wi-Fi access point with a larger than threshold signal strength).

In an example embodiment where the probe apparatus 20 causes a Cloud-based positioning service and/or positioning server to determine and/or generate the position estimate and/or the one or more characteristics of the position estimate, the Cloud-based positioning service and/or positioning server may provide the position estimate and/or the one or more characteristics of the position estimate such that they are received by the probe apparatus 20 and the probe apparatus 20 may then generate and provide a position quality communication or the Cloud-based positioning service and/or positioning server may generate and provide the position quality communication.

b. Example Operation of a Network Apparatus

In various embodiments, a network apparatus 10 may be configured to obtain a plurality of instances of positioning quality information (e.g., by receiving a plurality of positioning quality communications each comprising one or more instances of positioning quality information and/or accessing instances of positioning quality information from memory (e.g., memory 14). The network apparatus 10 may then partition the instances of positioning quality information into groups based on the position estimate of each instance of positioning quality information. The instances of positioning quality information assigned to each group are then partitioned into clusters based on the positioning approach indicator of each instance of positioning quality information assigned to the respective group. The one or more characteristics of the respective position estimates for each cluster of each group are processed to determine a respective positioning index corresponding to the respective cluster of the respective group.

In various embodiments, the network apparatus 10 processes the respective positioning indices for the respective clusters of a respective group to determine an instance of positioning index information for the group. For example, the network apparatus 10 may process the respective positioning indices for the respective clusters of a respective group to determine a positioning approach hierarchy and/or a set of positioning approach weights for use in positioning or navigation-related functions within the respective geographic area corresponding to the respective group.

The network apparatus 10 provides (e.g., transmits, provides through an application program interface (API) call, and/or the like) one or more instances of positioning index information such that a mobile apparatus 30, Cloud-based positioning service, and/or positioning server performs one or more positioning and/or navigation-related functions corresponding to the mobile apparatus 30 based at least in part on at least one instance of positioning index information. For example, the performance of one or more positioning and/or navigation-related functions corresponding to a mobile apparatus 30 may be controlled at least in part by an instance of positioning index information corresponding to the geographic area within which the mobile apparatus 30 is located.

FIG. 4 provides a flowchart illustrating operations performed, such as by the network apparatus 10 to generate and provide one or more instances of positioning index information, in accordance with an example embodiment. Starting at block 402, a plurality of instances of positioning quality information are obtained. For example, the network apparatus 10 may obtain a plurality of instances of positioning quality information by receiving one or more positioning quality communications each comprising one or more instances of positioning quality information. In an example embodiment, the network apparatus 10 stores the plurality of instances of positioning quality information to memory 14. For example, the network apparatus 10 may obtain a plurality of instances of positioning quality information by accessing the plurality of instances of positioning quality information from memory 14 (or another memory accessible to the processor 12). For example, a network apparatus 10 may comprise means, such as processor 12, memory 14, communications interface 16, and/or the like, for obtaining a plurality of instances of positioning quality information. In various embodiments, an instance of positioning quality information comprises a position estimate, a positioning approach indicator configured to identify the positioning approach used to determine the position estimate, and one or more characteristics of the position estimate.

At block 404, the plurality of instances of positioning quality information are partitioned into groups. In various embodiments, each group corresponds to a geographic area. For example, one or more grids of geographic areas are defined. A plurality of groups is defined where each group corresponds to a respective geographic area of the one or more grids of geographic areas. Each instance of positioning quality information is assigned to at least one group based on the position estimate of the respective instance of positioning quality information being located within the geographic area corresponding to the group. For example, a first instance of positioning quality information comprising a first position estimate is assigned to a first group responsive to the first position estimate being located within a first geographic area, where the first geographic area corresponds to the first group. For example, all of the instances of positioning quality information comprising position estimates that are located within a particular geographic area are assigned to the group corresponding to the particular geographic area.

For example, the network apparatus 10 may partition, group, and/or separate the plurality of instances of positioning quality information into a plurality of groups, where each group corresponds to a respective geographic area of the one or more grids of geographic areas, such that a respective instance of positioning quality information is assigned to at least one group corresponding to a respective geographic area in which the position estimate of the respective instance of positioning quality information is located. For example, the network apparatus 10 comprises means, such as processor 12, memory 14, and/or the like, for partitioning, grouping, and/or separating the plurality of instances of positioning quality information into a plurality of groups, where each group corresponds to a respective geographic area of the one or more grids of geographic areas, such that a respective instance of positioning quality information is assigned to at least one group corresponding to a respective geographic area in which the position estimate of the respective instance of positioning quality information is located.

At block 406, for each group, the instances of positioning quality information assigned to the respective group are partitioned, clustered, and/or separated based on the positioning approach used to generate and/or determine the respective position estimate. For example, for each group, the instances of positioning quality information assigned to the respective group are partitioned, clustered, and/or separated based on the respective positioning approach indicators of the respective instances of positioning quality information. For example, all of the instances of positioning quality information assigned to a first group that include a first position approach indicator are assigned to a first cluster of the first group and all of the instances of positioning quality information assigned to the first group that include a second position approach indicator are assigned to a second cluster of the first group. For example, the instances of positioning quality information assigned to a respective group are partitioned, clustered, and/or separated into a plurality of positioning approach clusters with each cluster of the plurality of clusters corresponding to a respective positioning approach. For example, a first instance of positioning quality information is assigned to a first cluster of the first group responsive to the respective positioning approach indicator of the first instance of positioning quality information matching, identifying, and/or corresponding to a first positioning approach corresponding to the first cluster.

In an example embodiment, the plurality of clusters defined for each group comprise a cluster corresponding to each of a GNSS-based positioning approach, a radio-based positioning approach, an RSS radio-based positioning approach, a time parameter (e.g., RTT) radio-based positioning approach, a motional positioning approach, a visual odometry-based positioning approach; and/or the like.

For example, in various embodiments, the plurality of instances of positioning quality information are partitioned and/or separated into clusters of instances of positioning quality information that were determined using the same positioning approach within the same geographic area.

In various embodiments, the network apparatus 10, for each group of the plurality of groups, partitions, clusters, and/or separates the instances of positioning quality information assigned to the respective group into clusters corresponding to respective positioning approaches based at least in part on the respective positioning approach identifiers of the instances of positioning quality information. For example, the network apparatus 10 comprises means, such as processor 12, memory 14, and/or the like, for, for each group of the plurality of groups, partitioning, clustering, and/or separating the instances of positioning quality information assigned to the respective group into clusters corresponding to respective positioning approaches based at least in part on the respective positioning approach identifiers of the instances of positioning quality information.

In various embodiments, the ordering of blocks 404 and 406 may vary from that shown in FIG. 4. For example, in an example embodiment, block 406 is performed prior to the performance of block 404. In another example embodiment, block 404 and block 406 are performed as part of the same partitioning operation (e.g., block 404 and block 406 are performed simultaneously).

At block 408, for at least one cluster of at least one group, a positioning index is determined. For example, in an example embodiment, for each cluster of each group, a positioning index is determined. In various embodiments, the network apparatus 10 determines respective positioning indices for the respective clusters of the respective groups. For example, the network apparatus 10 comprises means, such as processor 12, memory 14, and/or the like for determining respective positioning indices for the respective clusters of the respective groups. In an example embodiment, the determination of the respective positioning indices for the respective clusters of the respective groups may make use of map data (e.g., access from a digital map and/or geographic database stored in memory 14).

In various embodiments, the positioning index for a cluster is determined by processing the respective one or more characteristics of the position estimate. For example, in various embodiments, the positioning index for a cluster is determined based on a statistical distribution(s) of characteristics of the instances of positioning quality information assigned to the cluster. In various embodiments, the one or more measures of position estimate characteristics of an instance of positioning quality information includes one or more of a measure of uncertainty of the position estimate; characteristics of the positioning signals on which the position estimate was determined such as the number of positioning signals observed, the signal strength of the observed positioning signals, and/or the like; and/or various other characteristics of the positioning signals that indicate how the position estimate was determined. For example, in an example embodiment, the positioning index for a cluster is determined based on a statistical distribution or parameter of measures of uncertainty of the position estimates of the instances of positioning quality information assigned to the cluster. For example, in an example embodiment, the positioning index for a cluster is determined based on the average uncertainty of the position estimates of the instances of positioning quality information assigned to the cluster.

In various embodiments, the positioning index for a cluster is determined as a function of at least a portion of the respective characteristics of the respective instances of positioning quality information assigned to the cluster. In an example embodiment, the positioning index for a cluster is determined as a function of one or more of statistical parameters and/or distributions of a measure of uncertainty of the position estimates, of the number of positioning signals observed or used in determining the position estimate, of the signal strength of the observed positioning signals and/or the like for the instances of positioning quality information assigned to the cluster.

In various embodiments, the positioning index for a cluster is determined by a machine-learning trained model. For example, a machine-learning trained model is trained to receive as input the characteristics, and/or a description or statistical representation of a distribution thereof, of the instances of position quality information assigned to a cluster. the machine-learning trained model transforms the input based on one or more learned weights and/or parameters and the architecture of the model to generate and provide the positioning index for the cluster or an indication thereof as output. For example, the machine-learning trained model may be a deep neural network, a classifier, a model trained to identify patterns in the characteristics and/or distributions thereof, and/or the like.

In various embodiments, the positioning index corresponding to a respective cluster of a respective group is one of a numerical value or a classification. For example, the numerical value may provide a numerical representation of how reliable, dependable, usable, accurate, and/or the like a position estimate is that is determined using a positioning approach corresponding to the respective within the geographic area corresponding to the respective group. For example, the classification may provide an indication or a discrete metric of how reliable, dependable, usable, accurate, and/or the like a position estimate is that is determined using a positioning approach corresponding to the respective within the geographic area corresponding to the respective group. For example, the classification may indicate that the position estimate determined using a positioning approach corresponding to the respective within the geographic area corresponding to the respective group is highly, moderately, or not reliable, dependable, usable, accurate, and/or the like. Various discrete classifications may be defined in various embodiments, as appropriate for the application.

At block 410, a respective instance of positioning index information is determined for one or more groups of the plurality of groups. For example, in an example embodiment, a respective instance of positioning index information is determined for each group of the plurality of groups. For example, the network apparatus 10 determines respective instances of positioning index information for each group of the plurality of groups, in an example embodiment. For example, the network apparatus 10 comprises means, such as processor 12, memory 14, and/or the like, for determining respective instances of positioning index information for respective groups of the plurality of groups. In an example embodiment, the determination of the instances of positioning index information for the respective groups may make use of map data (e.g., access from a digital map and/or geographic database stored in memory 14).

In various embodiments, determining a respective instance of positioning index information for a group comprises processing the respective positioning indices of the clusters of the group. For example, the respective instance of positioning index information for a group may be determined based on aggregating and/or processing the respective positioning indices of each cluster of the group.

In various embodiments, an instance of positioning index information for a respective group comprises a positioning approach hierarchy and/or a set of positioning approach weights for use in positioning or navigation-related functions within the respective geographic area corresponding to the respective group. For example, a positioning approach hierarchy for use in the respective geographic area may be determined based on the respective positioning indices for the clusters of the group corresponding to the respective geographic area. For example, a positioning approach hierarchy for use in the respective geographic area may be determined based on the relative respective positioning indices for the clusters of the group corresponding to the respective geographic area. For example, a first positioning approach corresponding to the cluster having the positioning index indicating that the first positioning approach is the most reliable, dependable, usable, accurate, and/or the like within the respective geographic area may be rated the highest level/position in the positioning approach hierarchy. Similarly, a second positioning approach corresponding to the cluster having a positioning index indicating that the second positioning approach is the least reliable, dependable, usable, accurate, and/or the like within the respective geographic area may be rated the lowest level/position in the positioning approach hierarchy.

In various embodiments, an instance of positioning index information for a respective group comprises a set of positioning approach weights for use in generating a hybrid position estimate (e.g., a position estimate determined by aggregating and/or averaging two or more position estimates determined using two or more positioning approaches). For example, the instance of positioning information may be configured to control how a hybrid position estimate is determined and/or generated within the respective geographic area by providing weights that may be used to weight respective position estimates determined using respective positioning approaches.

FIG. 5 illustrates an example instance of positioning index information 500 illustrated as a table. In the illustrated example, the instance of positioning index information 500 includes a geographic area identifier configured to identify the respective geographic area, and a positioning index and hybrid approach weight for each of a plurality of positioning approaches. For example, the positioning approach column includes positioning approach identifiers for a plurality of positioning approaches.

The positioning index column indicates the positioning indices determined for the respective positioning approaches. In the illustrated embodiment, the higher the positioning the index, the more reliable, dependable, usable, accurate, and/or the like a position estimate determined using the respective positioning approach is expected to be within the respective geographic area. Thus, the positioning index column indicates a hierarchy of positioning approaches. For example, in the illustrated embodiment, the positioning approach corresponding to the highest positioning index should be the first choice of positioning approaches used in the respective geographic area, the positioning approach corresponding to the second highest positioning index should be the next choice of positioning approaches used in the respective geographic area, etc. For example, in an example embodiment, the instance of positioning index information 500 is configured to, when possible, cause a position estimate for a mobile apparatus located within the respective geographic area to be determined by the positioning approach corresponding to the highest positioning index. The instance of positioning index information 500 is further configured to, when it is not possible, to determine a position estimate for a mobile apparatus located within the respective geographic area using the positioning approach corresponding to the highest positioning index, cause the position estimate for the mobile apparatus to be determined using the positioning approach corresponding to the second highest positioning approach, if possible.

In the illustrated embodiment, the hybrid approach weight column of the instance of positioning index information 500 provides weight to be used to determine a hybrid position estimate for a mobile apparatus located within the geographic area. For example, in the illustrated embodiment, the position estimate $P_{GNSS}$ determined using the positioning approach identified by the positioning approach identifier "GNSS" (e.g., a GNSS-based positioning approach) is assigned a weight of 0.31, the position estimate $P_{RSS}$ determined using the positioning approach identified by the positioning approach identifier "Radio—RSS" (e.g., an RSS radio-based positioning approach) is assigned a weight of 0.37, the position estimate $P_{RTT}$ determined using the positioning approach identified by the positioning approach identifier "Radio—RTT" (e.g., an RTT radio-based positioning approach) is assigned a weight of 0.32, and position estimates generated using positioning approaches identified by the positioning approach identifiers "IMU/Motion" or "Visual" is assigned a weight of 0. Thus, the hybrid position estimate is determined as $0.31P_{GNSS}+0.37P_{RSS}+0.32P_{RTT}$.

At block 412, the network apparatus 10 provides at least one instance of positioning index information. In an example embodiment, the at least a one instance of positioning index information is provided as at least a portion of a look-up table. For example, the instances of positioning index information corresponding to the plurality of groups and/or one or more grids of geographic areas is provided as a look-up table indexed by geographic area identifiers, in an example embodiment. In an example embodiment, the at least one instance of positioning index information is incorporated into one or more digital records of a digital map and/or geographic database.

In various embodiments, the network apparatus 10 provides at least one instance of positioning index information such that one or more mobile apparatuses 30, a Cloud-based positioning service, at least one positioning server, and/or the like receive the at least one instance of positioning index information. For example, the network apparatus 10 comprises means, such as processor 12, memory 14, communications interface 16, and/or the like, for providing at least one instance of positioning index information such that one or more mobile apparatuses 30, a Cloud-based positioning service, at least one positioning server, and/or the like receive the at least one instance of positioning index information.

In various embodiments, the at least one instance of positioning index information is provided such that performance of at least one positioning and/or navigation-related function for a mobile apparatus 30 is at least partially controlled by the at least one instance of positioning index information. For example, in various embodiments, an instance of positioning index information corresponding to a geographic area is configured to cause a mobile apparatus 30 to perform a positioning or navigation-related function within the geographic area corresponding to the respective positioning indices determined for the clusters of the group corresponding to the geographic area.

c. Example Operation of a Mobile Apparatus

In various embodiments, a mobile apparatus 30 performs or causes performance of one or more positioning and/or navigation-related functions based at least in part on an instance of positioning index information. Some non-limiting examples of positioning and/or navigation-related functions include determination of positioning estimates, localization, route determination, lane level route determination, operating a vehicle along a lane level route, route travel time determination, lane maintenance, route guidance, lane level route guidance, provision of traffic information/data, provision of lane level traffic information/data, vehicle trajectory determination and/or guidance, vehicle speed and/or handling control, route and/or maneuver visualization, and/or the like.

In various embodiments, the mobile apparatus 30 performs the positioning and/or navigation-related function(s) based at least in part on an instance of positioning index information via processor 32 and/or other components of the mobile apparatus 30. In various embodiments, the mobile apparatus 30 causes the positioning and/or navigation-related function(s) to be performed based at least in part on an instance of positioning index information via processor 32 and/or other components of the mobile apparatus 30. For example, in various embodiments, the mobile apparatus 30 provides one or more observed positioning signals and/or descriptions/representations thereof to a Cloud-based positioning service, positioning server, and/or the like. Receipt and/or processing of the one or more observed positioning signals and/or descriptions/representations thereof causes the Cloud-based positioning service, positioning server, and/or the like to perform one or more positioning and/or navigation functions based at least in part on (e.g., controlled at least in part by) an instance of positioning index information.

FIG. 6 provides a flowchart illustrating operations performed, such as by the mobile apparatus 30 to use an instance of positioning index information to perform a navigation function, in accordance with an example embodiment. Starting at block 602, the mobile apparatus 30 receives one or more instances of positioning index information. For example, the mobile apparatus 30 may comprise means, such as processor 32, memory 34, communication interface 36, and/or the like for receiving one or more one or more instances of positioning index information. For example, a network apparatus 10 may provide one or more one or more instances of positioning index information such that the mobile apparatus 30 receives the one or more instances of positioning index information. In various embodiments, the one or more one or more instances of positioning index information are received as part of a geographic database, digital map, and/or one or more tiles of a digital map. In various embodiments, the mobile apparatus 30 may store the one or more one or more instances of positioning index information (e.g., as part of the geographic database, digital map, and/or one or more tiles of the digital map) in memory 34.

At block 604, the mobile apparatus 30 observes positioning signals. For example, the one or more sensors 39 may observe, capture, measure, and/or the like positioning signals and communicate a characterization of the observed positioning signals to the processor 32 of the mobile apparatus 30. For example, the mobile apparatus 30 observes positioning signals. For example, the mobile apparatus 30 may comprise means, such as the processor 32, memory 34, sensors 39, and/or the like, for observing positioning signals.

In various embodiments, one or more sensors 39 part of and/or co-located and in communication with the mobile apparatus 30. In various embodiments, various sensors of the one or more sensors 39 are configured to observe positioning signals. For example, the sensors 39 may comprise a GNSS sensor/receiver and the mobile apparatus 30 may observe GNSS positioning signals transmitted by GNSS satellites 45 via the functioning of the GNSS sensor/receiver.

In another example, the sensors 39 may comprise one or more radio interfaces (e.g., Bluetooth; Wi-Fi; cellular; and/or other radio frequency short, medium, or long range wireless communication protocol interface) such that the mobile apparatus 30 is configured to observe radio positioning signals transmitted by radio nodes and/or access points 40 via the functioning of the one or more radio interfaces.

In another example, the sensors 39 comprise IMU sensors, accelerometers, gyroscopes, magnetic sensors, barometers/pressure sensors, and/or other sensors configured to detect motion of the mobile apparatus 30. The mobile apparatus 30 may observe motion positioning signals through the functioning of such IMU and/or motion sensors.

In another example, the sensors 39 comprise one or more cameras, lidars, radars, or other imaging sensors configured to capture image data corresponding to the surroundings of the mobile apparatus 30. The mobile apparatus 30 may observe visual positioning signals through the functioning of such imaging sensors.

As should be understood, various other positioning signals may be observed based on the sensors 39 of the mobile apparatus 30 and their respective capabilities.

At block 606, responsive to determining that a trigger for performing a positioning and/or navigation-related function has been identified (e.g., based on user input received via user interface 38, a periodic and/or other trigger, etc.), the mobile apparatus 30 causes the positioning and/or navigation-related function to be performed based on at least a portion of the observed positioning signals and an instance of positioning index information corresponding to a geographic area within which the mobile apparatus 30 is located.

For example, in an example embodiment, responsive to determining that a trigger for performing a positioning and/or navigation function as been identified, the mobile apparatus 30 accesses (e.g., from memory 34) the instance of positioning index information corresponding to the geographic area within which the mobile apparatus 30 is located. In an example embodiment, the geographic area within which the mobile apparatus 30 is located is determined based at least in part on a most recent position estimate for the mobile apparatus 30. Based on the instance of positioning index information corresponding to the geographic area within which the mobile apparatus 30 is located and the capabilities of the mobile apparatus 30 (e.g., the sensors 39 that area part of and/or in communication with the mobile apparatus 30, the capabilities of the sensors 39, and/or the like), the mobile apparatus 30 determines and/or identifies which of the observed positioning signals and/or which positioning approach(es) to use to perform the positioning and/or navigation-related function.

The mobile apparatus 30 then performs the positioning and/or navigation-related function using the determined and/or identified positioning approach(es) and identified observed positioning signals, in an example embodiment. In an example embodiment, the mobile apparatus 30 provides the identified observed positioning signals and/or representations thereof such that a Cloud-based positioning service, positioning server, and/or the like receives the identified observed positioning signals and/or representations thereof and is caused to perform the positioning and/or navigation-related function using the determined and/or identified positioning approach(es) and identified observed positioning signals. In an example embodiment, the mobile apparatus 30 does not identify the positioning approach and/or observed positioning signals to be used and provides observed positioning signals and/or representations thereof to the Cloud-based positioning service, positioning server, and/or the like and the Cloud-based positioning service, positioning server, and/or the like identifies the positioning approach(es) and/or observed positioning signals to be used to perform the positioning and/or navigation-related function based on an instance of positioning index information corresponding to the geographic area within which the mobile apparatus 30 is located.

d. Technical Advantages

In various environments and/or in various geographic areas, different positioning approaches may be more or less effective. For example, while GNSS-based position estimates tend to be inaccurate in urban canyons, for example, while radio-based position estimates tend to be inaccurate in rural areas. However, determining which positioning approach or which combination of positioning approaches provides the most reliable, dependable, usable, and/or accurate position estimate within a geographic area may not be straight forward. For example, the usability of a positioning approach may depend on the observability of a sufficient number of positioning signals with received signal strengths of at least a threshold signal strength. the reliability and/or dependability of a positioning approach may depend on the likelihood of a corresponding positioning signal observable in the geographic area being manipulated (e.g., spoofed, jammed, etc.). Therefore, a mobile device located in a geographic area may perform positioning and/or navigation-related functions based at least in part on and/or resulting in position estimates with sub-optimal accuracy. As such technical problems exist regarding how to determine which positioning approaches should be used in which geographic areas.

Adding to these technical problems, it is not always obvious (e.g., based on map data and/or the like) which positioning approaches are likely to be preferred in various geographic areas. Additionally, different mobile apparatuses have different capabilities and therefore the preferred positioning approaches for different mobile apparatuses within the same geographic area may be different.

Various embodiments of the present disclosure provide methods, apparatuses, systems, computer program products, and/or the like that provide technical solutions to these technical problems and challenges. In particular, various embodiments provide methods, apparatus, computer program products, systems, and/or the like for generating and providing positioning index information for various geographic areas. The instances of positioning index information are configured to at least partially control the performance of positioning and/or navigation-related functions corresponding to mobile apparatuses located within respective geographic areas. In various embodiments, the instances of positioning information are determined based on crowd-sourced information corresponding to a plurality of different probe devices having various capabilities. An instance of positioning index information may be used to determine which positioning approach(es) to use in a particular geographic area for a mobile apparatus having particular capabilities and/or how to combine and/or aggregate different positioning approaches in a particular geographic area for mobile apparatuses having particular capabilities. Various embodiments therefore provide improved performance of positioning and/or navigation-related functions. For example, various embodiments are configured such that a mobile apparatus determines the most reliable, dependable, usable, and/or accurate position estimate available in a particular geographic area for the mobile apparatuses positioning signal observation capabilities. Various embodiments therefore provide technical improvements to the field of positioning technologies.

IV. Example Apparatus

The network apparatus 10, probe apparatus 20, and/or mobile apparatus 30 of an example embodiment may be embodied by or associated with a variety of computing devices including, for example, a navigation system including an in-vehicle navigation system, a vehicle control system, a personal navigation device (PND) or a portable navigation device, an advanced driver assistance system (ADAS), a global navigation satellite system (GNSS), a cellular telephone, a mobile phone, a personal digital assistant (PDA), a watch, a camera, a computer, and/or other device that can perform positioning and/or navigation-related functions, such as digital routing and map display.

Additionally or alternatively, the network apparatus 10, probe apparatus 20, and/or mobile apparatus 30 may be embodied in other types of computing devices, such as a server, a personal computer, a computer workstation, a laptop computer, a plurality of networked computing devices or the like, that are configured to update one or more map tiles, analyze probe points for route planning or other purposes, store and/or provide driving condition information/data, generate and provide sensor quality index tables and/or driving condition tables, and/or the like.

In an example embodiment, a probe apparatus 20, and/or mobile apparatus 30 is an in-vehicle navigation system onboard a vehicle 5 or a mobile device such as a smartphone and a network apparatus 10 is a server. In an example embodiment, a probe apparatus 20 is an apparatus configured to observe positioning signals and generate and/or cause generation of instances of positioning quality information corresponding to and/or describing position estimates generated for the location of the probe apparatus 20 based at least in part on the observed positioning signals.

In this regard, FIG. 2A depicts an example network apparatus 10, FIG. 2B depicts an example probe apparatus 20, and FIG. 2C depicts an example mobile apparatus 30 that may be embodied by various computing devices including those identified above. As shown, the network apparatus 10 of an example embodiment may include, may be associated with, or may otherwise be in communication with a processor 12 and a memory device 14 and optionally a communication interface 16 and/or a user interface 18.

Similarly, a probe apparatus 20 of an example embodiment may include, may be associated with, or may otherwise be in communication with a processor 22 and a memory device 24 and optionally a communication interface 26, a user interface 28, one or more sensors 29 (e.g., a location sensor such as a GNSS sensor/receiver; one or more radio interfaces (e.g., Bluetooth interface, Wi-Fi interface, cellular interface, and/or the like); IMU sensors; camera(s); image sensors; two dimensional (2D) and/or three dimensional (3D) light detection and ranging (LiDAR)(s); long, medium, and/or short range radio detection and ranging (RADAR); ultrasonic sensors; electromagnetic sensors; (near-) infrared (IR) cameras; 3D cameras; 3600 cameras; fuel level sensors; vehicle system sensors (e.g., oil status sensors, tire pressure sensors, engine oil pressure sensors, coolant level sensors, engine/coolant temperature sensors, and/or other sensors that enable the probe apparatus 20 to determine one or more features of the probe apparatus's 20 surroundings and/or monitor a vehicle's 5 operating parameters), and/or other components configured to perform various operations, procedures, functions, or the like described herein.

In an example embodiment, a mobile apparatus 30 of an example embodiment may include, may be associated with, or may otherwise be in communication with a processor 32 and a memory device 34 and optionally a communication interface 36, a user interface 38, one or more sensors 39 (e.g., a location sensor such as a GNSS sensor/receiver; one or more radio interfaces (e.g., Bluetooth interface, Wi-Fi interface, cellular interface, and/or the like); IMU sensors; camera(s); image sensors; two dimensional (2D) and/or three dimensional (3D) light detection and ranging (LiDAR) (s); long, medium, and/or short range radio detection and ranging (RADAR); ultrasonic sensors; electromagnetic sensors; (near-) infrared (IR) cameras; 3D cameras; 360° cameras; fuel level sensors; vehicle system sensors (e.g., oil status sensors, tire pressure sensors, engine oil pressure sensors, coolant level sensors, engine/coolant temperature sensors, and/or other sensors that enable the mobile apparatus 30 to determine one or more features of the mobile apparatus's 30 surroundings and/or monitor a vehicle's 5 operating parameters), and/or other components configured to perform various operations, procedures, functions, or the like described herein.

In some embodiments, the processor 12, 22, 32 (and/or co-processors or any other processing circuitry assisting or otherwise associated with the processor) may be in communication with the memory device 14, 24, 34 via a bus for passing information among components of the apparatus. The memory device may be non-transitory and may include, for example, one or more volatile and/or non-volatile memories. In other words, for example, the memory device may be an electronic storage device (e.g., a non-transitory computer readable storage medium) comprising gates configured to store data (e.g., bits) that may be retrievable by a machine (e.g., a computing device like the processor). The memory device may be configured to store information, data, content, applications, instructions, or the like for enabling the apparatus to carry out various functions in accordance with an example embodiment of the present invention. For example, the memory device could be configured to buffer input data for processing by the processor. Additionally or alternatively, the memory device could be configured to store instructions for execution by the processor.

As described above, the network apparatus 10, probe apparatus 20, and/or mobile apparatus 30 may be embodied by a computing device. However, in some embodiments, the apparatus may be embodied as a chip or chip set. In other words, the apparatus may comprise one or more physical packages (e.g., chips) including materials, components and/or wires on a structural assembly (e.g., a baseboard). The structural assembly may provide physical strength, conservation of size, and/or limitation of electrical interaction for component circuitry included thereon. The apparatus may therefore, in some cases, be configured to implement an embodiment of the present invention on a single chip or as a single "system on a chip." As such, in some cases, a chip or chipset may constitute means for performing one or more operations for providing the functionalities described herein.

The processor 12, 22, 32 may be embodied in a number of different ways. For example, the processor 12, 22, 32 may be embodied as one or more of various hardware processing means such as a coprocessor, a microprocessor, a controller, a digital signal processor (DSP), a processing element with or without an accompanying DSP, or various other processing circuitry including integrated circuits such as, for example, an ASIC (application specific integrated circuit), an FPGA (field programmable gate array), a microcontroller unit (MCU), a hardware accelerator, a special-purpose computer chip, or the like. As such, in some embodiments, the processor 12, 22, 32 may include one or more processing cores configured to perform independently. A multi-core processor may enable multiprocessing within a single physical package. Additionally or alternatively, the processor 12, 22, 32 may include one or more processors configured in tandem via the bus to enable independent execution of instructions, pipelining and/or multithreading.

In an example embodiment, the processor 12, 22, 32 may be configured to execute instructions stored in the memory device 14, 24, 34 or otherwise accessible to the processor. Alternatively or additionally, the processor may be configured to execute hard coded functionality. As such, whether configured by hardware or software methods, or by a combination thereof, the processor may represent an entity (e.g., physically embodied in circuitry) capable of performing operations according to an embodiment of the present invention while configured accordingly. Thus, for example, when the processor is embodied as an ASIC, FPGA or the like, the processor may be specifically configured hardware for conducting the operations described herein. Alternatively, as another example, when the processor is embodied as an executor of software instructions, the instructions may specifically configure the processor to perform the algorithms and/or operations described herein when the instructions are executed. However, in some cases, the processor may be a processor of a specific device (e.g., a pass-through display or a mobile terminal) configured to employ an embodiment of the present invention by further configuration of the processor by instructions for performing the algorithms and/or operations described herein. The processor may include, among other things, a clock, an arithmetic logic unit (ALU) and logic gates configured to support operation of the processor.

In some embodiments, the network apparatus 10, probe apparatus 20, and/or mobile apparatus 30 may include a user interface 18, 28, 38 that may, in turn, be in communication with the processor 12, 22, 32 to provide output to the user, such as one or more routes through a road network, a notification that a vehicle is approaching a human operator assistance portion of a route, and/or the output of one or more other navigation functions, and, in some embodiments, to receive an indication of a user input. As such, the user interface may include one or more output devices such as a display, speaker, and/or the like and, in some embodiments, may also include one or more input devices such as a keyboard, a mouse, a joystick, a touch screen, touch areas, soft keys, a microphone, a speaker, or other input/output mechanisms. Alternatively or additionally, the processor may comprise user interface circuitry configured to control at least some functions of one or more user interface elements such as a display and, in some embodiments, a speaker, ringer, microphone and/or the like. The processor and/or user interface circuitry comprising the processor may be configured to control one or more functions of one or more user interface elements through computer program instructions (e.g., software and/or firmware) stored on a memory accessible to the processor 12, 22, 32 (e.g., memory device 14, 24, 34 and/or the like).

The network apparatus 10, probe apparatus 20, and/or mobile apparatus 30 may optionally include a communication interface 16, 26, 36. The communication interface may be any means such as a device or circuitry embodied in either hardware or a combination of hardware and software that is configured to receive and/or transmit data from/to a network and/or any other device or module in communication with the apparatus. In this regard, the communication interface may include, for example, an antenna (or multiple antennas) and supporting hardware and/or software for enabling communications with a wireless communication network. Additionally or alternatively, the communication interface may include the circuitry for interacting with the antenna(s) to cause transmission of signals via the antenna(s) or to handle receipt of signals received via the antenna(s). In some environments, the communication interface may alternatively or also support wired communication. As such, for example, the communication interface may include a communication modem and/or other hardware/software for supporting communication via cable, digital subscriber line (DSL), universal serial bus (USB) or other mechanisms.

In addition to embodying the network apparatus 10, probe apparatus 20, and/or mobile apparatus 30 of an example embodiment, a navigation system may also include or have access to a geographic database. For example, in various embodiments, a network apparatus 10, probe apparatus 20, and/or mobile apparatus 30 may comprise a component (e.g., memory 14, 24, 34, and/or another component) that stores a digital map (e.g., in the form of a geographic database) comprising a first plurality of data records, each of the first plurality of data records representing a corresponding traversable map element, wherein at least some of said first plurality of data records include at least one sensor quality index table. For example, the geographic database may include a variety of data (e.g., map information/data) utilized in various positioning and/or navigation-related functions such as constructing a route or navigation path, determining the time to traverse the route or navigation path, matching a geolocation (e.g., a GNSS determined location) to a point on a map, a lane of a lane network, and/or link, one or more localization features and a corresponding location of each localization feature, and/or the like. For example, a geographic database may include road segment, pedestrian and/or bike path segment, link, or traversable map element (TME) data records, point of interest (POI) data records, localization feature data records, and other data records. More, fewer or different data records can be provided. In one embodiment, the other data records include cartographic ("carto") data records, routing data, and maneuver data. One or more portions, components, areas, layers, features, text, and/or symbols of the POI or event data can be stored in, linked to, and/or associated with one or more of these data records. For example, one or more portions of the POI, event data, or recorded route information can be matched with respective map or geographic records via position or GNSS data associations (such as using known or future map matching or geo-coding techniques), for example. In an example embodiment, the data records may comprise nodes, connection information/data, intersection data records, link data records, POI data records, and/or other data records. In an example embodiment, the network apparatus 10 may be configured to modify, update, and/or the like one or more data records of the geographic database. For example, the network apparatus 10 may modify, update, generate, and/or the like map information/data corresponding to TMEs, links, lanes, road segments, pedestrian and/or bike path segments, travel lanes of road segments, nodes, intersection, and/or the like and/or the corresponding data records (e.g., to add or update a corresponding one or more instances of positioning index information), a localization layer (e.g., comprising localization features) and/or the corresponding data records, and/or the like.

In an example embodiment, the TME data records are links, lanes, or segments, e.g., maneuvers of a maneuver graph, representing roads, travel lanes of roads, streets, or paths (e.g., pedestrian and/or bike paths), as can be used in the calculated route or recorded route information for determination of one or more personalized routes. The intersection data records are end points corresponding to the respective links or segments of the road segment data records. The TME data records and the intersection data records represent a road network, such as used by vehicles, cars, and/or other entities. Alternatively, the geographic database can contain path segment and intersection data records or nodes and connection information/data or other data that represent pedestrian paths or areas in addition to or instead of the vehicle road record data, for example.

The TMEs, road/link/pedestrian and/or bike path segments, intersections, and/or nodes can be associated with attributes, such as geographic coordinates, street names, address ranges, speed limits, turn restrictions at intersections, and other navigation related attributes, as well as POIs, such as gasoline stations, hotels, restaurants, museums, stadiums, offices, automobile dealerships, auto repair shops, buildings, stores, parks, etc. The geographic database can include data about the POIs and their respective locations in the POI data records. The geographic database can also include data about places, such as cities, towns, or other communities, and other geographic features, such as bodies of water, mountain ranges, etc. Such place or feature data can be part of the POI data or can be associated with POIs or POI data records (such as a data point used for displaying or representing a position of a city). In addition, the geographic database can include and/or be associated with event data (e.g., traffic incidents, constructions, scheduled events, unscheduled events, etc.) associated with the POI data records or other records of the geographic database.

The geographic database can be maintained by the content provider (e.g., a map developer) in association with the services platform. By way of example, the map developer can collect geographic data to generate and enhance the geographic database. There can be different ways used by the map developer to collect data. These ways can include obtaining data from other sources, such as municipalities or respective geographic authorities. In addition, the map developer can employ field personnel to travel by vehicle along roads throughout the geographic region to observe features and/or record information about them, for example. Also, remote sensing, such as aerial or satellite photography, can be used.

The geographic database can be a master geographic database stored in a format that facilitates updating, maintenance, and development. For example, the master geographic database or data in the master geographic database can be in an Oracle spatial format or other spatial format, such as for development or production purposes. The Oracle spatial format or development/production database can be compiled into a delivery format, such as a geographic data files (GDF) format. The data in the production and/or delivery formats can be compiled or further compiled to form geographic database products or databases, which can be used in end user navigation devices or systems.

For example, geographic data is compiled (such as into a platform specification format (PSF) format) to organize and/or configure the data for performing navigation-related functions and/or services, such as route calculation, route guidance, map display, speed calculation, distance and travel time functions, and other functions. The navigation-related functions can correspond to vehicle navigation or other types of navigation. The compilation to produce the end user databases can be performed by a party or entity separate from the map developer. For example, a customer of the map developer, such as a navigation device developer or other end user device developer, can perform compilation on a received geographic database in a delivery format to produce one or more compiled navigation databases. Regardless of the manner in which the databases are compiled and maintained, a navigation system that embodies a network apparatus 10, probe apparatus 20, mobile apparatus 30, and/or informant apparatus 40 in accordance with an example embodiment may determine the time to traverse a route that includes one or more turns at respective intersections more accurately.

V. Apparatus, Methods, and Computer Program Products

As described above, FIGS. 3, 4, and 6 illustrate flowcharts of a network apparatus 10, probe apparatus 20, and/or mobile apparatus 30, methods, and computer program products according to an example embodiment of the invention. It will be understood that each block of the flowcharts, and combinations of blocks in the flowcharts, may be implemented by various means, such as hardware, firmware, processor, circuitry, and/or other devices associated with execution of software including one or more computer program instructions. For example, one or more of the procedures described above may be embodied by computer program instructions. In this regard, the computer program instructions which embody the procedures described above may be stored by the memory device 14, 24, 34 of an apparatus employing an embodiment of the present invention and executed by the processor 12, 22, 32 of the apparatus. As will be appreciated, any such computer program instructions may be loaded onto a computer or other programmable apparatus (e.g., hardware) to produce a machine, such that the resulting computer or other programmable apparatus implements the functions specified in the flowchart blocks. These computer program instructions may also be stored in a computer-readable memory that may direct a computer or other programmable apparatus to function in a particular manner, such that the instructions stored in the computer-readable memory produce an article of manufacture the execution of which implements the function specified in the flowchart blocks. The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flowchart blocks.

Accordingly, blocks of the flowcharts support combinations of means for performing the specified functions and combinations of operations for performing the specified functions for performing the specified functions. It will also be understood that one or more blocks of the flowcharts, and combinations of blocks in the flowcharts, can be implemented by special purpose hardware-based computer systems which perform the specified functions, or combinations of special purpose hardware and computer instructions.

In some embodiments, certain ones of the operations above may be modified or further amplified. Furthermore, in some embodiments, additional optional operations may be included. Modifications, additions, or amplifications to the operations above may be performed in any order and in any combination.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

That which is claimed:

1. A method performed by at least one apparatus, the method comprising:
   obtaining a plurality of instances of positioning quality information, each instance of positioning quality information comprising a respective position estimate, a respective positioning approach indicator, and a respective characteristic of the respective position estimate;

partitioning the plurality of instances of positioning quality information into a plurality of groups and a plurality of clusters, each group of the plurality of groups having multiple clusters of the plurality of clusters associated therewith, wherein the plurality of instances of positioning quality information are partitioned into the plurality of groups based on the respective position estimates in the plurality of instances of positioning quality information and the plurality of instances of positioning quality information are partitioned into the plurality of clusters based on the respective positioning approach indicators in the plurality of instances of positioning quality information;

for each respective cluster of each respective group, determining a respective positioning index based at least in part on respective characteristics of the respective instances of positioning quality information assigned to the respective cluster;

providing at least one instance of positioning index information, the at least one instance of positioning index information comprising one or more of: (i) a geographic area identifier identifying a respective geographic area corresponding to the respective group, (ii) at least one positioning index or (iii) a positioning approach identifier identifying a respective positioning approach corresponding to the at least one positioning index; and wherein the respective positioning index is determined by a machine-learning trained model configured to receive at least one of the respective characteristics of the respective instances of positioning quality information assigned to the respective cluster of the respective group or a statistical representation of a distribution of the respective characteristics of the respective instances of positioning quality information assigned to the respective cluster of the respective group as input and provide an indication of a positioning index value as output.

2. The method of claim 1, wherein the at least one instance of positioning index information is configured to cause a mobile device to perform a positioning or navigation-related function within a geographic area corresponding to the respective group based at least in part on respective positioning approach.

3. The method of claim 1, wherein the respective positioning index for the respective cluster of the respective group is determined based on a statistical distribution of the respective characteristics of the respective instances of positioning quality information assigned to the respective cluster of the respective group.

4. The method of claim 1, wherein the respective characteristics comprises at least one of an uncertainty of the respective position estimate, a number of signal sources observed by a probe device for at least one positioning approach at the location indicated by the respective position estimate, or at least one signal strength value for at least one of the signal sources observed by the probe device for the at least one positioning type at the location indicated by the respective position estimate.

5. The method of claim 4, wherein the probe device is a mobile computing apparatus that generated the respective instance of positioning quality information.

6. The method of claim 1, wherein the respective positioning index is determined as a function of at least a portion of the respective characteristics of the respective instances of positioning quality information assigned to the respective cluster of the respective group.

7. The method of claim 1, wherein a first instance of positioning quality information comprising a first position estimate is assigned to a first group responsive to the first position estimate being located within a first geographic area, the first geographic area corresponding to the first group, and the first instance of positioning quality information is assigned to a first cluster of the first group responsive to the respective positioning approach of the first instance of positioning quality information matching a first positioning approach corresponding to the first cluster.

8. The method of claim 1, further comprising processing respective positioning indices for the respective cluster of a respective group to determine an instance of positioning index information for the respective geographic area, the instance of positioning index information comprising at least one of (i) a positioning approach hierarchy or (ii) a set of positioning approach weights for use in positioning or navigation-related functions within the respective geographic area.

9. The method of claim 8, wherein the positioning index information provides at least one of (i) the positioning approach hierarchy or (ii) the set of positioning approach weights for the respective group.

10. The method of claim 1, wherein the at least one instance of positioning index information is (a) provided as at least a portion of a look-up table or (b) is incorporated into one or more data records of a digital map.

11. The method of claim 1, wherein the respective geographic areas are defined as a grid of geographic areas.

12. The method of claim 11, wherein a plurality of grids of geographic areas are defined, with each grid defining a set of respective geographic areas of different sizes.

13. An apparatus comprising at least one processor, a communications interface configured for communicating via at least one network, and at least one memory storing computer program code, the at least one memory and the computer program code configured to, with the processor, cause the apparatus to at least:

obtain a plurality of instances of positioning quality information, each instance of positioning quality information comprising a respective position estimate, a respective positioning approach indicator, and a respective characteristic of the respective position estimate;

partition the plurality of instances of positioning quality information into a plurality of groups and a plurality of clusters, each group of the plurality of groups having multiple clusters of the plurality of clusters associated therewith, wherein the plurality of instances of positioning quality information are partitioned into the plurality of groups based on the respective position estimates in the plurality of instances of positioning quality information and the plurality of instances of positioning quality information are partitioned into the plurality of clusters based on the respective positioning approach indicators in the plurality of instances of positioning quality information;

for each respective cluster of each respective group, determine a respective positioning index based at least in part on respective characteristics of the respective instances of positioning quality information assigned to the respective cluster;

provide a grid of positioning index information comprising a plurality of instances of positioning index information, a respective position in the grid corresponding to the respective geographic area and the at each instance of positioning index information of the plurality of instances of positioning index information comprising at least one of (i) at least one positioning index or (ii) a positioning approach identifier identifying a respective positioning approach corresponding to the at least one positioning index; and wherein the respective positioning index is (a) determined as a function of at least a portion of the respective characteristics of the respective instances of positioning quality information assigned to the respective cluster of the respective group or (b) determined by a machine-learning trained model configured to receive at least one of the respective characteristics of the respective instances of positioning quality information assigned to the respective cluster of the respective group or a statistical representation of a distribution of the respective characteristics of the respective instances of positioning quality information assigned to the respective cluster of the respective group as input and provide an indication of a positioning index value as output.

14. The apparatus of claim 13, wherein the grid of positioning index information is configured to cause a mobile device to perform a positioning or navigation-related function within the respective geographic area corresponding to the respective group based at least in part on the respective positioning approach.

15. The apparatus of claim 13, wherein the respective positioning index for the respective cluster of the respective group is determined based on a statistical distribution of the respective characteristics of the respective instances of positioning quality information assigned to the respective cluster of the respective group.

16. The apparatus of claim 13, wherein the at least one memory and the computer program code are further configured to, with the processor, cause the apparatus to at least process respective positioning indices for the respective cluster of a respective group to determine an instance of positioning index information for the respective geographic area, the instance of positioning index information comprising at least one of (i) a positioning approach hierarchy or (ii) a set of positioning approach weights for use in positioning or navigation-related functions within the respective geographic area.

17. The apparatus of claim 13, wherein the grid of positioning index information is (a) provided as at least a portion of a look-up table or (b) is incorporated into one or more data records of a digital map.

* * * * *